(12) United States Patent
Alexis

(10) Patent No.: US 7,565,115 B2
(45) Date of Patent: Jul. 21, 2009

(54) COMMUNICATION SYSTEM FOR LANDLINE AND WIRELESS CALLS

(75) Inventor: Glenroy J. Alexis, Ellicott City, MD (US)

(73) Assignee: Xcelis Communications, LLC, Chalfont, PA (US)

( * ) Notice: Subject to any disclaimer, the term of this patent is extended or adjusted under 35 U.S.C. 154(b) by 939 days.

(21) Appl. No.: 10/359,277

(22) Filed: Feb. 6, 2003

(65) Prior Publication Data

US 2004/0008636 A1  Jan. 15, 2004

Related U.S. Application Data

(60) Provisional application No. 60/394,283, filed on Jul. 9, 2002.

(51) Int. Cl.
```
H04Q 7/38      (2006.01)
H04Q 7/20      (2006.01)
H04M 11/00     (2006.01)
H04B 1/38      (2006.01)
H04B 1/40      (2006.01)
```

(52) U.S. Cl. .......... 455/74.1; 455/426.1; 455/462; 455/552.1; 455/572

(58) Field of Classification Search .......... 455/552.1, 455/552, 572, 462.1, 462, 74.1, 426.1
See application file for complete search history.

(56) References Cited

U.S. PATENT DOCUMENTS

| 4,658,096 | A |   | 4/1987  | West, Jr. et al. ........... 379/59 |
|-----------|---|---|---------|-------------------------------------|
| 4,752,949 | A | * | 6/1988  | Steinbeck et al. ......... 455/74.1 |
| 4,775,997 | A |   | 10/1988 | West, Jr. et al.                    |
| 4,887,290 | A |   | 12/1989 | Dop et al.                          |
| 4,890,315 | A |   | 12/1989 | Bendixen et al.                     |
| 4,972,457 | A |   | 11/1990 | O'Sullivan                          |
| 4,991,197 | A |   | 2/1991  | Morris                              |
| 5,127,041 | A |   | 6/1992  | O'Sullivan                          |
| 5,463,674 | A | * | 10/1995 | Gillig et al. ............. 455/552.1 |
| 5,526,403 | A | * | 6/1996  | Tam ....................... 455/426.1 |
| 5,533,099 | A |   | 7/1996  | Byrne                               |
| 5,675,629 | A |   | 10/1997 | Raffel et al.                       |
| 5,715,296 | A |   | 2/1998  | Schornack et al. .......... 379/58  |
| 5,745,851 | A |   | 4/1998  | Goto                                |
| 5,812,637 | A |   | 9/1998  | Schornack et al. .......... 379/59  |
| 5,878,344 | A |   | 3/1999  | Zicker                              |
| 5,903,835 | A |   | 5/1999  | Dent                                |
| 5,937,334 | A | * | 8/1999  | Peterson et al. .......... 455/74.1  |
| 5,946,616 | A |   | 8/1999  | Schornack et al. ........ 455/422   |
| 5,966,428 | A |   | 10/1999 | Ortiz Perez et al. ......... 379/27 |
| 6,002,937 | A | * | 12/1999 | Young et al. .............. 455/462  |
| 6,035,220 | A |   | 3/2000  | Claudio et al. ............ 455/564  |
| 6,125,277 | A |   | 9/2000  | Tanaka                              |
| 6,195,531 | B1|   | 2/2001  | Aguirre et al.                      |
| 6,240,277 | B1|   | 5/2001  | Bright ..................... 455/741 |
| 6,256,518 | B1| * | 7/2001  | Buhrmann .................. 455/572  |
| 6,324,410 | B1|   | 11/2001 | Giacopelli et al.                   |

(Continued)

Primary Examiner—William D. Cumming
(74) Attorney, Agent, or Firm—Nixon & Vanderhye, PC

(57) ABSTRACT

Users can make landline, wireless and/or internet calls from a conventional landline communication device. If the communication device is on a wireless call, that call may be placed on hold to answer an incoming call on the landline. Likewise, if the communication device is on a landline call, that call may be placed on hold to answer an incoming call on the wireless telephone. Wireless and landline calls may also be conferenced together.

23 Claims, 23 Drawing Sheets

U.S. PATENT DOCUMENTS

| | | |
|---|---|---|
| 6,366,784 B1 | 4/2002 | Hsueh |
| 6,404,772 B1 | 6/2002 | Beach et al. |
| 6,405,027 B1 | 6/2002 | Bell |
| 6,466,799 B1 | 10/2002 | Torrey et al. |
| 6,567,661 B2 | 5/2003 | McDonnell et al. |
| 6,584,146 B2 | 6/2003 | Bose et al. |
| 6,584,490 B1 | 6/2003 | Schuster et al. |
| 6,603,977 B1 | 8/2003 | Walsh et al. |
| 6,611,692 B2 * | 8/2003 | Raffel et al. ................ 320/115 |
| 6,625,423 B1 * | 9/2003 | Wang ....................... 455/74.1 |
| 6,775,522 B2 | 8/2004 | Schornack et al. ......... 455/74.1 |
| 6,778,824 B2 | 8/2004 | Wonak et al. ............ 455/426.2 |
| 6,785,517 B2 | 8/2004 | Schornack et al. ......... 455/74.1 |
| 2001/0030950 A1 | 10/2001 | Chen et al. |
| 2001/0038689 A1 | 11/2001 | Liljestrand et al. |
| 2002/0007490 A1 | 1/2002 | Jeffery |
| 2002/0059434 A1 | 5/2002 | Karaoguz et al. |
| 2002/0065935 A1 | 5/2002 | Koperda et al. |
| 2002/0086666 A1 | 7/2002 | Chen |
| 2002/0094072 A1 | 7/2002 | Evans et al. |
| 2002/0104095 A1 | 8/2002 | Nguyen et al. |
| 2002/0193107 A1 | 12/2002 | Nascimento, Jr. |
| 2003/0046689 A1 | 3/2003 | Gaos |

* cited by examiner

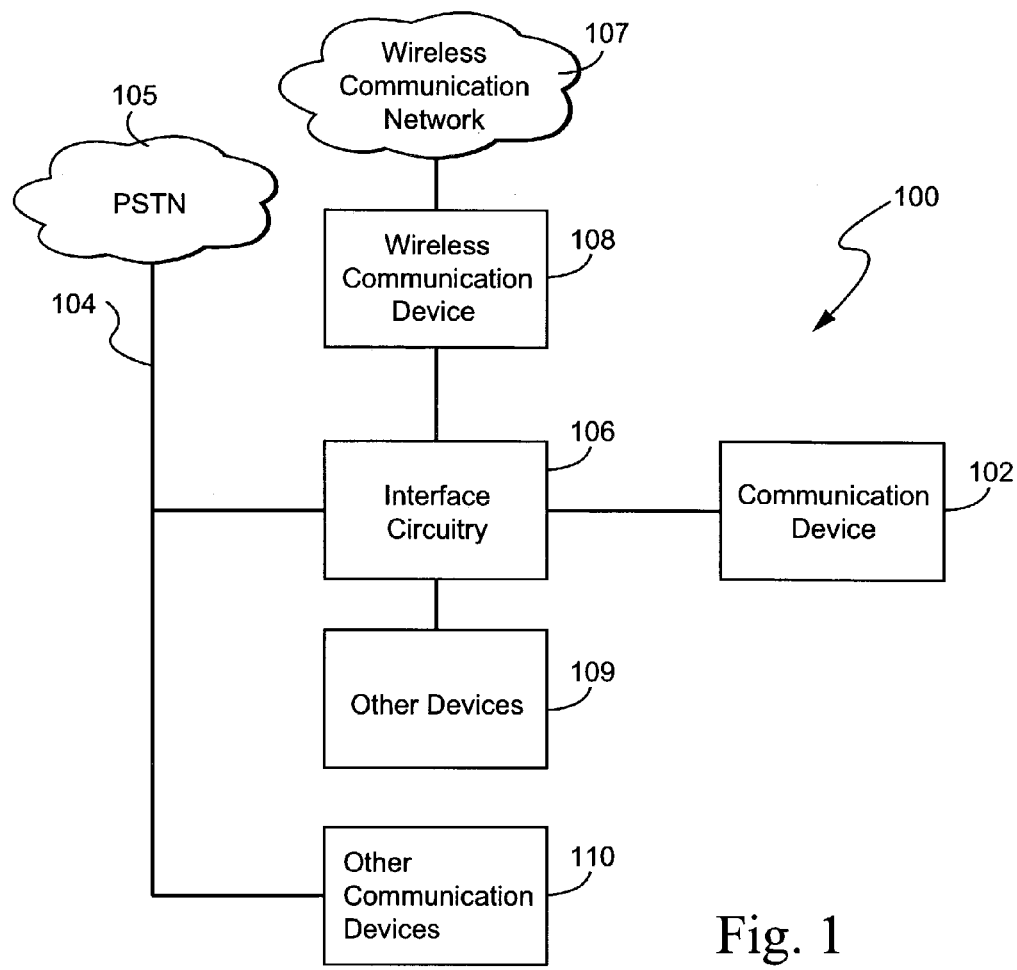

Fig. 1

| Communication Device Status | Switch 30 | Switch 32 | Switch 34 | AudioSwitch 38 | Hold Switch 12 |
|---|---|---|---|---|---|
| Placing/Received Landline Call | On | On | Off | Off | Off |
| Receiving Cell Call | Off | On | On | On | Off |
| Making Cell Call | Off | On | On | On | Off |
| Ringing Phone on Incoming Landline Call | Off | On | On | Off | Off |
| Ringing Phone on Incoming Cellular Call | Off | On | On | Off | Off |
| During Call Waiting Signal (300ms) to Phone while on Landline Call. | Off | Off | On | Off | On |
| Default Connections when Phone is off Hook | Off | On | On | On | Off |

Fig. 3

COMMUNICATION SYSTEM FOR LANDLINE AND WIRELESS CALLS

CROSS-REFERENCE TO RELATED APPLICATION

This application claims priority from provisional Application No. 60/394,283, filed Jul. 9, 2002, the contents of which are incorporated herein in their entirety.

BACKGROUND AND SUMMARY OF THE INVENTION

This application generally relates to communication systems and methods and, more particularly, to such systems and methods in which communication devices for the conventional Public Switched Telephone Network (PSTN) may be interfaced with other communication networks such as wireless communication networks and the Internet.

The use of cellular telephones has dramatically increased, resulting in many individuals having at least two different telephones: a conventional landline telephone for home use and a cellular telephone for use away from home or for business. Cellular service providers (CSPs) now offer low-cost calling plans to attract new customers and retain current customers. Eventually, CSPs are likely to offer calling plans (e.g., unlimited nationwide calling) at rates that cause users to consider whether they have any need to subscribe to local telephone companies for telephone services.

Despite the fact that many cellular phone users can make unlimited long distance calls on nights and weekends, it is still an underused feature. In some cases, the under-usage is because many cellular phone users are unable to receive a signal strong enough to make cellular phone calls from their homes. In addition, cellular phones are not designed to maintain long conversations (e.g., greater than 30-minutes) due to over-heating. The ergonomic design and limited battery life of cellular phones further discourages their prolonged use.

In one example embodiment of the communication systems and methods described herein, users can make wireless telephone calls from a conventional landline communication device connected via interface circuitry to a single ring tip line pair. The communication device may be any communication device that is ordinarily configured for communication over a landline such as a telephone, a computer system, a set-top box, a personal video recording device, etc. The interface circuitry is also connected to a wireless communication device. Among other things, the interface circuitry permits both landline calls and wireless calls to be placed and received using the landline communication device. Other communication devices connected to the same landline may be used to place and receive landline calls even if the landline communication device is being used to place or receive a wireless call. The interface circuitry is configured so that if the landline communication device is on a wireless call, that call may be placed on hold to answer an incoming landline call. Likewise, if the landline communication device is on a landline call, that call may be placed on hold to answer an incoming wireless call. Landline and wireless calls may also be conference together. In one example embodiment, the system may be provided with a very sensitive and powerful wireless transceiver that permits the capture and transmission of wireless signals. Although such a transceiver is not required, such a feature if provided extends the communication range of the wireless communication device that is connected thereto.

In an illustrative implementation, upon receipt of an incoming wireless call, the interface circuitry automatically and distinctively rings the landline communication device connected thereto. If the landline communication device is answered, the interface circuitry establishes an audio path between the wireless communication device and the landline communication device. If the user wishes to place a wireless call using the landline communication device, the user picks up the telephone, dials the number of the called party, and then enters a predetermined wireless call code. The interface circuitry provides the number to the wireless communication device, which then dials the number (bypassing the local telephone company). To place a landline call, the user enters a predetermined landline call code that is recognized by the interface circuitry. The communication device is connected to the PSTN and the call may then be placed through the PSTN.

The system can provide wireless connectivity to personal computers, facsimile machines, printers and other computer and electronic devices. Such wireless connectivity allows the system to take advantage of third generation (3G) cellular networks and systems. For example, if the system received video information or text data, the information can be sent to a television screen, computer monitor, printer, facsimile machine and the like.

In accordance with another example embodiment of the communication systems and methods described herein, a communication system includes a caller ID (CID)-enabled landline communication device and interface circuitry connected to a ring-tip line pair and to a wireless communication device. The interface circuitry includes a memory and a processing circuit for transferring data from the wireless communication device to the memory, selectively reading out the contents of the memory in response to inputs from a user requesting display of the contents, and transferring the read-out memory contents to the communication device using a CID protocol. In one illustrative implementation, the read-out data comprises names and telephone numbers. In this case, the inputs from the user may be used to dial a displayed number and/or read out a next or previous name and telephone number. The inputs from the user may also be used to access names beginning with certain letters.

These and other features and advantages provided by the invention will be better and more completely understood by referring to the following detailed description of presently preferred embodiments in conjunction with the drawings.

BRIEF DESCRIPTION OF THE DRAWINGS

FIG. 1 is a generalized block diagram of an example communication system 100;

FIG. 3 is a table summarizing the states of the switches in the example interface circuitry 106 shown in FIG. 2A for various functions and operations;

FIG. 5A is a flowchart showing an illustrative Main Loop; FIG. 5B is a flowchart showing an illustrative Off-Hook routine; FIG. 5C is a flowchart showing an illustrative Incoming Cell Call routine; FIG. 5D is a flowchart showing an illustrative Incoming Landline Call routine; FIG. 5E is a flowchart showing an illustrative Outgoing Call routine; FIG. 5F is a flowchart showing an illustrative Phone On-Hook Routine; FIG. 5G is a flowchart showing an illustrative Outgoing Landline Call routine; FIG. 5H is a flowchart showing an illustrative Flash Button Pressed routine; FIG. 5I is a flowchart showing an illustrative Outgoing Cell Call routine; FIG. 5J is a flowchart showing an illustrative Incoming Calls Check routine; FIG. 5K is a flowchart showing an illustrative Call Waiting routine; and FIG. 5L is a flowchart showing an illustrative Ten Second Timer routine;

FIG. 7A shows example operations that occur when the telephone goes into the off-hook state; FIG. 7B shows example operations that occur at the end of all calls; FIG. 7C shows example operations that occur when a cell call is received while the user is on a landline call; FIGS. 7D and 7E show example operations that occur when a landline call is received while the user is on a cell call; and FIG. 7F shows example operations that occur when there is an incoming call;

DETAILED DESCRIPTION

Figure 2A:
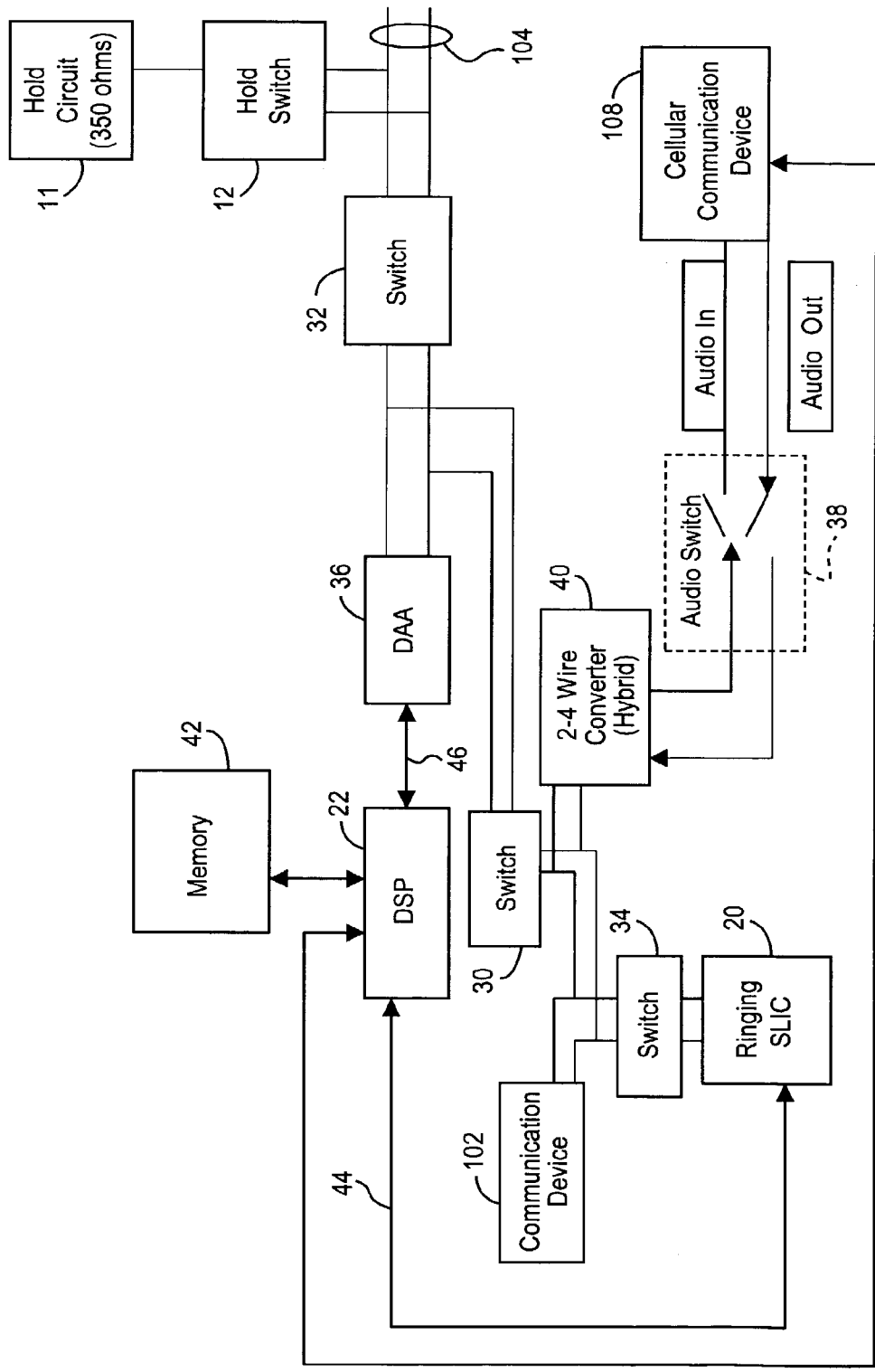
FIG. 2A is a circuit block diagram of one example of interface circuitry 106.

FIG. 1 is a generalized block diagram of an example communication system 100. Communication system 100 includes a communication device 102 connected via interface circuitry 106 to a ring-tip line pair 104 for landline calls over the PSTN 105. As is well-known, PSTN 105 includes a hierarchy of telephony switching offices. For example, individual subscribers are connected to a nearby telephone exchange, sometimes referred to as an end office or switching office; the switching office is connected to a local central office; the local central office is connected to a toll office; the toll office is connected to a primary telephony center; and the primary telephony center is connected to a sectional telephony center. Sectional telephony centers are connected to regional telephony centers, which typically are the highest level in the PSTN 105 switching hierarchy. Other communication devices 110 may also be connected to line pair 104. The communication devices 102, 110 may be any communication devices that are configured for communication over PSTN 105 such as telephones, computer systems, facsimile machines, set-top boxes, personal video recording devices, etc.

Interface circuitry 106 is also connected to a wireless communication device 108 for a wireless communication network 107. Wireless communication network 107 may be for any conventional wireless service such as analog advanced mobile phone service (AMPS), digital advanced mobile phone service (D-AMPS), global system for mobile communications (GSM), personal communication service (PCS), satellite service (including low earth-orbiting satellites), specialized mobile radio (SMR), and cellular digital packet data (CDPD). A cellular communication network, for example, is made up of cells, each of which includes at least radio transmitter/receiver with which a cellular communication device can communicate. Under the control of a switching office, the radio transmitter/receiver with which the cellular communication device communicates changes as the cellular communication device moves from one cell to another. Example cellular communication devices include cellular telephones and cellular personal digital assistants (PDAs). In the following description, communication devices 102 and 108 are sometimes referred to as telephones. However, use of the term "telephone" in a particular instance is not intended to exclude the possibility of using other communication devices.

Among other things, interface circuitry 106 permits both landline calls via PSTN 105 and wireless calls via wireless communication network 107 to be placed and received using communication device 102. The other communication devices 110 connected to the same landline 104 as communication device 102 may be used for landline calls even if communication device 102 is being used to place or receive a wireless call because, during a wireless call, communication device 102 is physically disconnected from landline 104 and is connected to the wireless communication device 108 via interface circuitry 106. As will be discussed in greater detail below, the interface circuitry is configured so that if communication device 102 is engaged in a wireless call, that wireless call may be placed on hold to answer an incoming landline call via PSTN 105. Likewise, if the communication device 102 is engaged in a landline call, that landline call may be placed on hold to answer an incoming wireless call via wireless communication network 107. Wireless and landline calls can also be conferenced together.

Communication system 100 may also include other devices 109 connected to interface circuitry 106. For example, such devices may be output devices for outputting information received via the wireless communication system. These devices may include a television, a monitor, a facsimile machine, a printer and the like.

To make a call over PSTN 105 from communication device 102, a user first inputs a predetermined code (e.g., "#") to the communication device. For example, if the communication device is a telephone, the user may press certain buttons on the keypad of the telephone. Among other things, this code results in interface circuitry 106 connecting communication device 102 to line pair 104. Thereafter, the user can simply dial the number of the called party. To make a call over the wireless communication network from communication device 102, the user simply dials the number of the called party and enters a predetermined code (e.g., "#") when dialing is finished. When the predetermined code is entered at the end of the called party's number, interface circuitry 106 provides the dialed number to the wireless communication device which then dials the number to place the call.

As an alternative or in addition to determining how to place a call based on the inputting of predetermined codes, the interface circuitry may automatically determine whether to place a call from communication device 102 via PSTN 105 or wireless communication network 107. For example, if one of the other communication devices 110 is already on a landline call, interface circuitry 106 may detect this condition and automatically place any call from communication device 102 over wireless communication network 107 using wireless communication device 108. Interface circuitry 106 may also determine whether to place a particular call from communication device 102 over PSTN 105 or over wireless communication network 107. This determination may, by way of illustration, be based on cost. For example, some monthly cellular telephone plans provide for low cost long-distance calls at certain times such as evenings and weekends. If wireless communication device 108 is a cellular telephone connected to a cellular telephone network, interface circuitry 106 may therefore be configured with intelligence (e.g., real time clock to determine time that a call is placed, a memory storing calling rates, etc.) to place long distance calls from communication device 102 over the cellular communication network via the cellular telephone at these times.

FIG. 2A is a circuit block diagram of one example of interface circuitry 106. In FIG. 2A, wireless communication device 108 is a cellular device and wireless network 107 is a cellular network. It will of course be appreciated that the following description is applicable to any of the wireless devices and services mentioned above. Line pair 104 provides DC current (e.g., to power electronics of the communication device 102), AC current to ring the telephone bell, and a full duplex communication path. A hold circuit 11 is selectively connected via a hold switch 12 across the tip-ring pair to place a call on hold without disconnecting the call. Hold circuit 11 may, for example, comprise a 350-ohm resistor. Communication device 102 is connected to line pair 104 via first and second switches 30, 32.

The interface circuitry also includes a ringing Subscriber Line Interface Circuit (SLIC) 20 that performs a variety of functions. Ringing SLIC 20 detects and decodes Dual Tone Multi-Frequency (DTMF) codes generated by communication device 102 and communicates these codes to Digital Signal Processor (DSP) 22. Ringing SLIC 20 creates and generates standard and custom telephone signals and tones such as busy signals, dial tones, and the like, and also rings the communication device 102 when there is an incoming call from PSTN 105 or cellular communication network 107. Specifically, DAA 36 detects incoming calls via line pair 104 and provides an incoming landline call signal to DSP 22. In response to this signal, DSP 22 causes ringing SLIC 20 to ring communication device 102. Similarly, DSP 22 detects incoming calls to cellular communication device 108 via its connection thereto over bus 48. In response to this detection, DSP 22 causes ringing SLIC 20 to ring communication device 102. Ringing SLIC 20 may provide different rings to distinguish between incoming cellular and landline calls. Ringing SLIC 20 also generates analog signals used, for example, to send information such as CID (Caller ID) data to communication device 102. In addition, because communication device 102 is only selectively connected to line pair 104, an integrated DC-DC converter of ringing SLIC 20 is used to power the communication device. Thus, for example, if the communication device is a telephone, a user is able to press buttons on the telephone even though the telephone is not connected to the landline 104. This is desirable because during a cellular call, the telephone needs an external power supply. As noted above, such power is provided by line pair 104 during a landline call. Ringing SLIC 20 also performs on-hook and off-hook detection and generates on-hook and off-hook detection signals that are provided to DSP 22 in response to these detections. On-hook refers to the state in which the communication device is not being used such as when a telephone handset is placed on the cradle. Off-hook is the state when the communication device is in use such as when a telephone handset is removed from the cradle, releasing the hook switch. Ringing SLIC 20 performs serial communication by sending data over a bus 44 to DSP 22 using a standard communication protocol such as 4-wire Serial Peripheral Interface (SPI) protocol. Bus 44 is used to send status information (on-hook, off-hook, ringing, etc) to DSP 22, and DSP 22 uses bus 44 to send commands and retrieve information from ringing SLIC 20.

DSP 22 is the central processor of interface circuitry 106 and controls all the functions thereof. For example, DSP 22 is connected via bus 48 to the external data connector of the cellular communication device 108. DSP 22 can control the functions of the cellular telephone (e.g., dialing, answering incoming calls, ending calls, power on/off, etc.) via commands sent over bus 48. Software is programmed into DSP 22 and/or is accessible from memory 42 to implement the various functions described herein. While a DSP is used as a control circuit in the example embodiment, it will be appreciated that various other types of control circuits including microprocessors, microcontrollers, logic circuits, application specific integrated circuits (ASICs), programmable array logic, etc. and combinations thereof may be used to implement some or all of the functions described herein.

DAA 36 is an analog interface to line pair 104 whose primary function is to monitor the voltage/current of line pair 104 and to detect incoming landline calls. DAA 36 is connected to DSP 22 via a bidirectional serial communication line 46 and communicates with DSP 22 when certain events occur such as an incoming landline call. DAA 36 detects incoming CID information, functions as a data modem, and may be provided with protocol stacks for applications such as internet access (e.g., dial-up) and voice-over-IP. The DAA has analog-to-digital converters for converting the analog audio signal from line pair 104 to a digital stream that is sent to DSP 22 and digital-to-analog converters for converting digital audio from DSP 22 to analog audio signals that are output to line pair 104. DAA 36 complies with the telephone standard of many countries. 2-to-4-wire (hybrid) converter 40 is a line interface provided between communication device 102 and cellular communication device 108 for, among other things, providing line impedance matching and 2-to-4 wire conversion. Converter 40 permits communication device 102 to send/receive audio to/from cellular communication device 108.

The example interface circuitry shown in FIG. 2A includes various switches to connect/disconnect elements from each other. These switches are controlled by DSP 22. For ease of illustration, the connections between DSP 22 and the swtiches are not shown in FIG. 2A. Although these switches are shown in FIG. 2A as hardware switches, the switching may in fact be implemented in software as discussed in detail below with reference to FIG. 8. First switch 30 is used to disconnect communication device 102 from line pair 104 to reduce the possibility of the user hearing noise if the user is on a cellular call and there is an incoming landline call, or if someone is on another extension in the home or office. First switch 30 is used in conjunction with third switch 34 to allow calls to be placed from communication device 102 either via PSTN 105 or cellular communication network 107. Second switch 32 is used to selectively connect/disconnect DAA 36 to line pair 104. This arrangement allows DAA 36 to monitor all activity of line pair 104 (i.e., incoming calls, line voltages, etc). Second switch 32 is used in conjunction with hold switch 12 to place a landline call on hold without disconnecting it. Third switch 34 is used to disconnect communication device 102 from ringing SLIC 20 during a landline call. This avoids damage to ringing SLIC 20 when the communication device 102 is being used in landline mode (e.g., placing or receiving a landline call). Hold switch 12 selectively connects a 350-ohm resister of hold circuit 11 across the line pair 104 and permits a call to be placed on hold without the call being disconnected by the local phone company. Finally, audio switch 38 switches the audio path between cellular communication device 108 and communication device 102 on and off. Audio switch 38 allows the system to place a cellular call on hold, while the user answers a landline call during a call-waiting situation. If desired, audio switch 38 may be omitted and a mute function of converter 40 may be used to perform functions similar to those of audio switch 38.

To make a call over PSTN 105, the user first places communication device 102 in the off-hook state. Ringing SLIC 20 detects this off-hook state and sends an off-hook signal to DSP 22. In response to the off-hook signal, DSP 22 closes second switch 32 and third switch 34, and opens first switch 30, audio switch 38 and hold switch 12. The user then presses the # button. Ringing SLIC 20 detects this button press and sends the # button press code to DSP 22. In response to the # button press code, DSP 22 connects communication device 102 to line pair 104 by controlling the various switches so that first and second switches 30, 32 are closed and third switch 34, hold switch 1-2 and audio switch 38 are open. The user then dials a telephone number to place a call over PSTN 105. If the called party answers, communication such as conversation may begin. If the called party does not answer, the calling party hangs up and communication device 102 is then in an on-hook state.

To make a call over cellular communication network 107 via cellular communication device 108, the user again places communication device 102 in the off-hook state. Ringing SLIC 20 detects this off-hook state and sends an off-hook signal to DSP 22. In response to the off-hook signal, DSP 22 closes second and third switches 32, 34 and opens first switch 30, audio switch 38 and hold switch 12. The user then dials the desired telephone number, which is detected and decoded by ringing SLIC 20 and forwarded to DSP 22. When the user presses "#" after entering the telephone number, DSP 22 closes audio switch 38 and then communicates the telephone number over bus 48 to cellular communication device 108, which thereafter dials the number. DSP 22 may, for example, use RS232 protocol at 9600 baud to communicate over bus 48 with the cellular telephone, although other protocols may readily be utilized. Because audio switch 38 is closed, an audio path is provided between cellular communication device 108 and communication device 102. If the called party answers, communication such as conversation may begin. If the called party does not answer, the calling party hangs up and communication device 102 is then in an on-hook state. Ringing SLIC 20 detects the on-hook state and sends an on-hook signal to DSP 22. DSP 22 thereafter ends the cellular call and disconnects communication device 102 from cellular communication device 108 by opening audio switch 38.

In the above-described implementation, the interface circuitry connects the communication device 102 for a PSTN call in response to the input of a predetermined code before the user enters a telephone number and connects the communication device for a wireless network call in response to the input of a predetermined code after the user enters a telephone number. Of course, it will be readily appreciated that the interface circuitry may be configured to connect the communication device for a wireless call in response to the input of a predetermined code before the user enters a telephone number and to connect the communication device for a PSTN call in response to the input of a predetermined code after the user enters a telephone number.

Figure 2B:
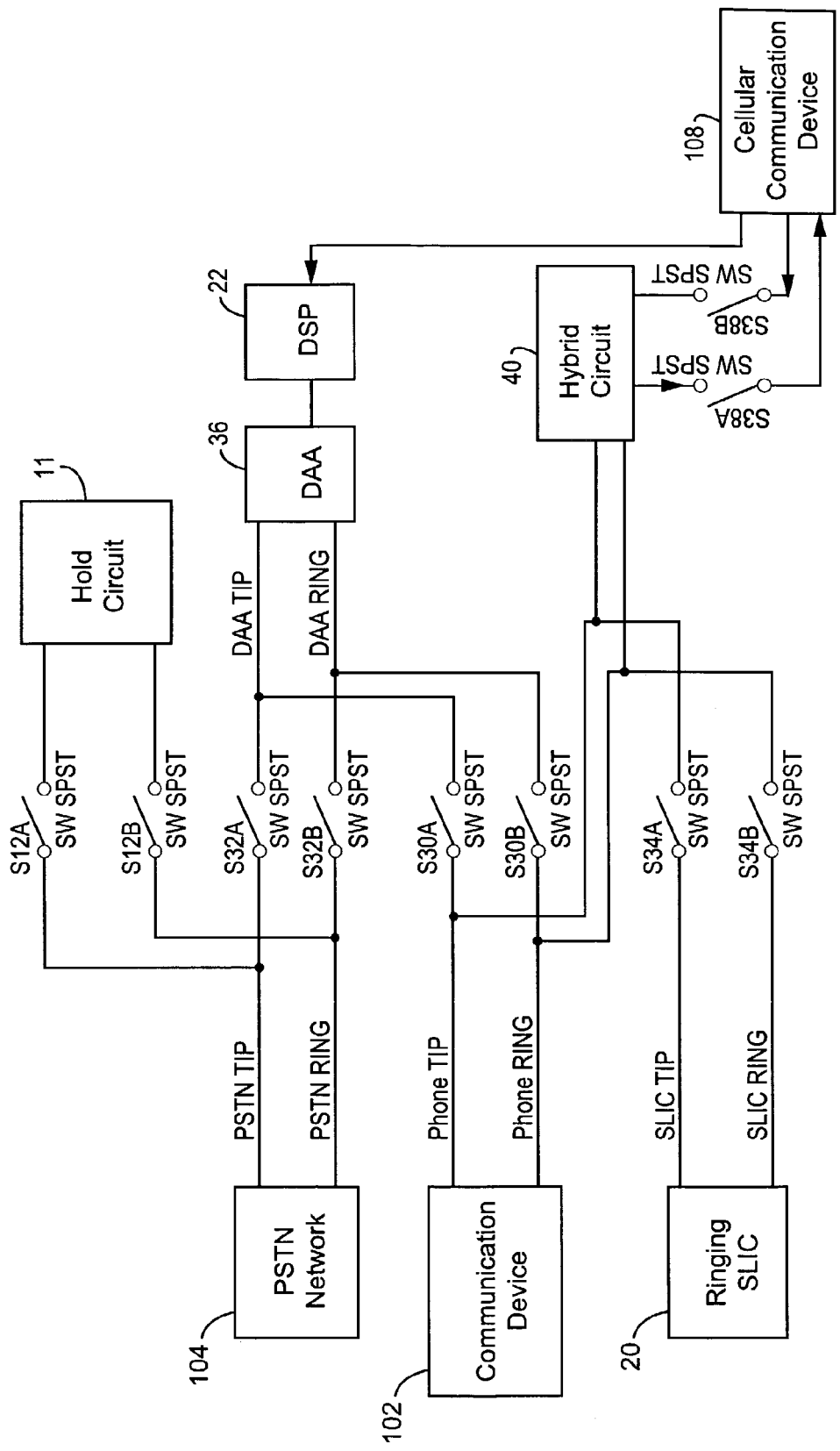
FIG. 2B is a detailed schematic showing the interconnections of the various switches in the example interface circuitry 106 shown in FIG. 2A.

FIG. 2B is a detailed schematic showing the interconnections of the various switches in the example interface circuitry 106 shown in FIG. 2A. As discussed above, DSP 22 controls the switches in order to perform various functions and operations. A first switch configuration is used when placing or receiving a call via PSTN 105. In this configuration, first and second switches 30A, 30B, 32A, 32B are closed and third switch 34A, 34B; hold switch 12A, 12B; and audio switch 38A, 38B are open. In this first switch configuration, communication device 102 is connected via closed first and second switches 30, 32 to line pair 104. Audio switch 38 is open to disconnect communication device 102 from the cellular communication device 108. Because communication device 102 receives power from line pair 104, third switch 34 is also open. A second switch configuration is used when placing or receiving a call via cellular communication network 107. In this second configuration, first switch 30A, 30B and hold switch 12A, 12B are open. Second and third switches 32A, 32B, 34A, 34B and the audio switch 38A, 38B are closed. Closing switch 32A, 32B allows DAA 36 to detect incoming calls via PSTN 105 when the communication device 102 is being used for a cellular call. A third switch configuration is for the on-hook state (i.e., when communication device 102 is not being used to place or receive a landline or a cellular call). In this third configuration, first switch 30A, 30B; hold switch 12A, 12B; and audio switch 38A, 38B are open. Second and third switches 32A, 32B, 34A, 34B are closed.

To place a landline call on hold and connect to a cellular call, switch 12A, 12B is closed and the second switch configuration is then utilized. To place a cellular call on hold and connect to an incoming landline call, the first switch configuration is utilized. Thus, the user has call waiting between landline and cellular calls and the user can press the flash button on their phone to activate this feature (i.e., place the landline call on hold, and answer incoming cellular call or vice versa) when they hear the special call waiting tone. If the user does not subscribe to call waiting, there is a possibility that during a call waiting event (e.g., the user is on a landline call, and there is an incoming cellular call), when the user presses the flash button, the local telephone company will see this flash event and disconnect the landline call. This is because when the flash button is pressed the telephone goes in the on-hook state for 300-700 ms and then goes back into the off-hook state. In short, if the user does not subscribe to a call waiting service, the phone company may disconnect the landline call when the flash button is pressed. To circumvent this problem, the flash button is re-mapped to another button on the telephone such as the "*" button. In this case, during a call waiting event (as described above) the user presses the "*" button instead of the flash button on his/her telephone. The telephone company will know that the "*" button is pressed, but this press will be ignored. On the other hand, because the interface circuitry can detect an incoming call, when it detects that the "*" button is pressed during a call waiting event, the system places the landline call on hold, and connects the user to the cellular call. This flash functionality can also be provided using a dedicated flash button. Call conferencing between cellular and landline calls may be accomplished in response to an appropriate user input by closing audio switch 38 and placing the other switches in the same configuration as for a landline call (i.e., the first switch configuration described above).

FIG. 3 is a table summarizing the states of the switches in the example interface circuitry 106 shown in FIG. 2A for various representative functions and operations.

Figure 4:
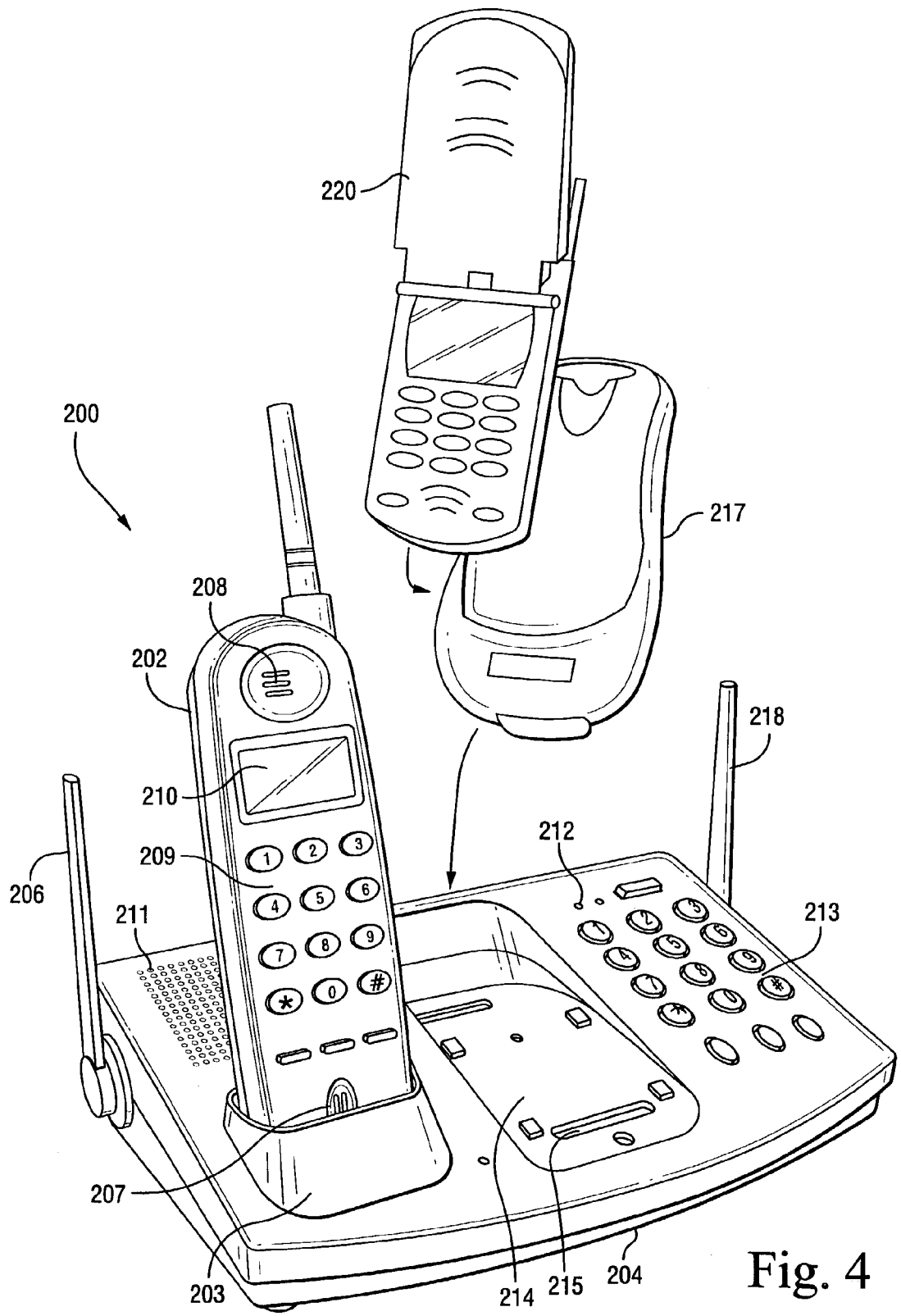
FIG. 4 is a perspective view of a example arrangement for practically implementing the system discussed with respect to FIG. 1.

FIG. 4 is a perspective view of an example arrangement for practically implementing the system discussed with respect to FIG. 1. While this example arrangement shows the system components provided in an integrated manner, the invention is not limited in this respect. For example, the interface circuitry may be physically separate from the communication device and connected between the line pair and the communication device. The arrangement shown in FIG. 4 includes a telephone handset 202 received in a cradle 203 of a base unit 204. Base unit 204 is—connected (not shown) to line pair 104 (see FIG. 2A) and to a power outlet (not shown). Handset 202 and base unit 204 are configured for cordless communication using antennas 205 and 206 as is well known in the art. The handset includes a microphone 207, a speaker 208, and a keypad 209 that can be used, for example, to place and receive calls. Keypad 209 includes numeric keys 1-9, a "*" key, a "#"

key and three function keys. The function keys may include a flash button, a mute button, a hold button, an answering machine button, and the like. Handset 202 may also include a display 210 such as a liquid crystal display. Various arrangements of keypad 209 and display 210 may be used and the invention is not limited in this respect.

Base unit 204 includes a speaker 211, a microphone 212 and a keypad 213 that can be used, for example, to place and receive calls without using the handset. Base unit 204 also includes a cradle 214 with connector 215, which includes electrical contacts for electrically connecting the base unit to the data connector of a cellular telephone 220. Because the electrical connectors of cellular telephones typically differ from manufacturer to manufacturer (and even within models from the same manufacturer), FIG. 4 shows cellular telephone 220 connected to base unit 204 via an adapter 217 that "adapts" the electrical connector configuration of the cellular phone to the electrical connector configuration of base unit 204. Of course, it will be readily apparent that the systems and methods described herein are not in any way limited to an arrangement in which an adapter is required to connect the cellular telephone to the base unit. For example, different base units may be provided with electrical connectors that are specific to a particular manufacturer or even a particular model. In this case, the cellular telephone may be directly inserted into cradle 214. Of course, the advantage of an adapter is that a single base unit with a universal electrical connector may be used, provided adapters are used that "adapt" the particular electrical connector configuration of different cellular telephones to the universal connector configuration of the base unit.

Interface circuitry 106 is incorporated within base unit 204. The interface circuitry may include RF circuitry (not shown) for improving the range of the cellular telephone 220, for example, by boosting the power of the transmitted cellular signals and by improving the cellular signal levels that can be detected using an antenna 218. This RF circuitry may be connected to the cellular telephone via the cellular telephone's external antenna connector (not shown).

As explained above, interface circuitry 106, among other things, permits both landline calls and cellular calls to be placed and received using the handset 202. To place a wireless call, the user takes the handset 202 off-hook, enters the telephone number of the called party, and enters "#" (or some other code) after entering the telephone number. If desired, the cellular signals are communicated via the aforementioned RF circuitry. If the called party answers, audio is communicated between the user and the called party via an audio path within the interface circuitry. To place a PSTN call, the user first enters "#" (or some other code). The interface circuitry recognizes this code as indicating that the user wishes to place a PSTN call. The switches within the interface circuitry are then controlled so that handset 202 is connected to line pair 104 and the user can then dial the number of a called party and place the call over the PSTN.

Because DSP 22 is typically configured (or may be easily configured) with the appropriate protocol stacks for Internet access, the user of the systems and methods described herein has the ability of making three types of calls when communication device 102 goes off-hook: landline, wireless and internet (IP). The called party does not have to have the system described herein to receive such calls. In what follows, the user is assumed to have a dialup connection, although other connections such as broadband connections can also be used.

Figure 9:
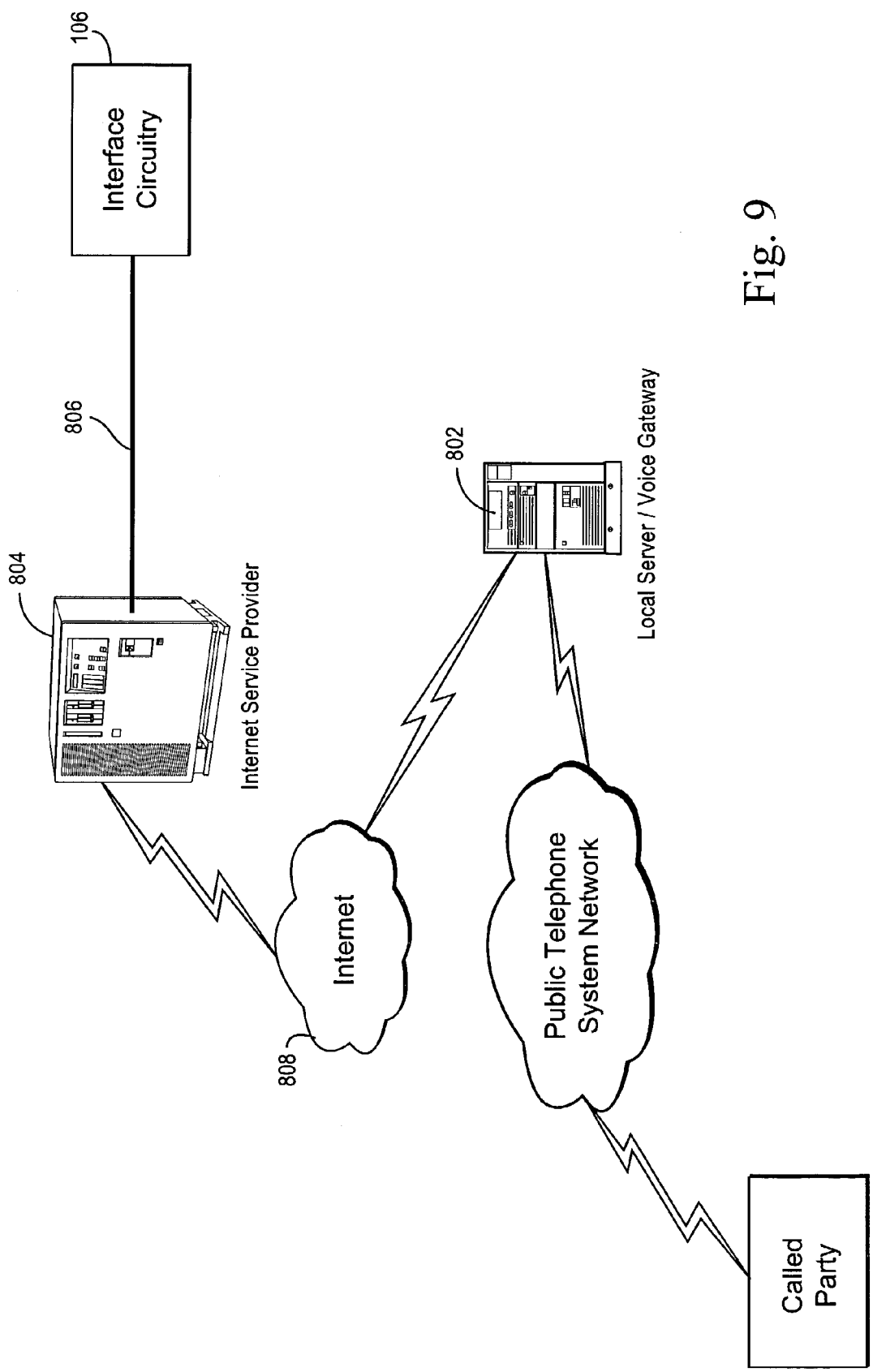
FIG. 9 shows components involved in making an internet call.

With reference to FIG. 9, ISP's typically have local servers/ voice gateways 802 located in major cities throughout the United States and other countries. Interface circuitry 106 connects to an ISP 804 over a landline 806 of the PSTN. The user's voice is digitized by the ringing SLIC 20, packetized by DSP 22, and communication is established over the Internet 808 with a local server/voice gateway 802 that corresponds to the area code and local exchange of the called party. The local server then places a local call to the called party's number over the PSTN and, if the called party answers, a communication link is thereby established between the interface circuitry 106 and the called party. The voice gateway converts digital audio from the server and injects it onto the telephone line to the called party. The voice gateway converts analog audio from the called party to digital data, encapsulates it and communicates it to the server, which in turn, forwards the data to the interface circuitry over the internet. Interface circuitry 106 converts the digital data to an analog signal, which can be heard by the calling party.

More specifically, to place a voice-over-Ip (VOIP) call, the user lifts handset, and presses a predetermined internet call code, which places the interface circuitry into an IP call mode. Under the control of DSP 22, DAA 36 dials and connects to the user's ISP. When this connection is established, the user is provided with a confirmation tone, which indicates that a call may now be placed. The user then dials the number he/she wishes to call (e.g., 410-555-5555). When interface circuitry 106 detects the DTMF button presses, it decodes the area code (in this case, the area code for Maryland) and decodes the local exchange "555" which will be assumed to be for Columbia, Md. Then, interface circuitry 106 sends signal via ISP 804 to a local server/voice gateway that is located in that local exchange (i.e., Columbia, Md.). When communication is established with the local server/voice gateway, an instruction is sent which instructs the local server to dial the following number of the called party (i.e., 410-555-5555). The voice (PSTN) gateway of the local server places the call to called party's number. When the call is answered, the gateway acts as the interface between the PSTN call and the IP call. Incoming internet calls to interface circuitry 106 would be the same as receiving a normal landline call because the call would be placed by a local server/voice gateway.

DSP 22 of interface circuitry 106 executes software stored in internal memory and/or in an external memory accessible thereto (such as memory 42). This memory may be read-only memory, read/write memory or some combination thereof and may be volatile and/or non-volatile. Generally speaking, the operations described below may be implemented in hardware, firmware and/or software. In the example embodiment of interface circuitry 106 shown in FIG. 2A, the operations are implemented using software. The data and instructions for this software are stored in a storage medium such as memory 42 that is accessible to DSP 22. DSP 22 executes these instructions in response to various signals supplied thereto such as on-hook signals, off-signals, and the like. For purposes of the FIG. 5 discussion below, communication device 102 is a telephone. However, as noted above, the invention is not limited in this respect.

FIGS. 5A-5L are flowcharts showing various example routines for the interface circuitry 106. The program including these routines may be implemented, for example, using an event-driven state machine. After an event is handled, the state machine enters a "do-nothing" state until another event occurs. At the end of a routine, control generally returns to the calling routine. For example, if routine A calls routine B, control returns to routine A when routine B ends.

Figure 5A:
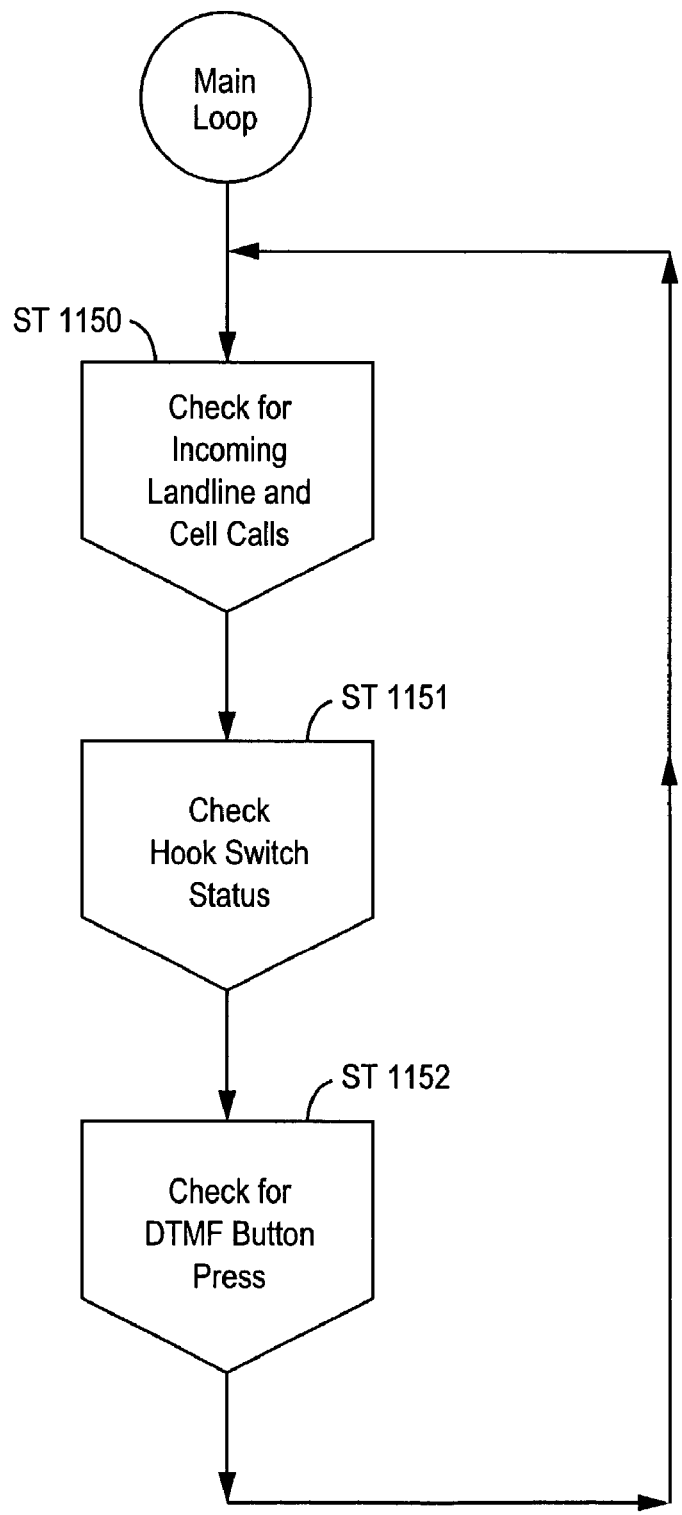
FIGS. 5A-5L are flowcharts showing various example routines for the interface circuitry 106.

FIG. 5A is a flowchart showing an illustrative Main Loop. At ST, 1150, a check is made for incoming landline and cell calls. At ST 1151, a check of hook switch status is made and at ST 1152 a check is made for DTMF keypresses. The routine then returns to ST 1150.

Figure 5B:
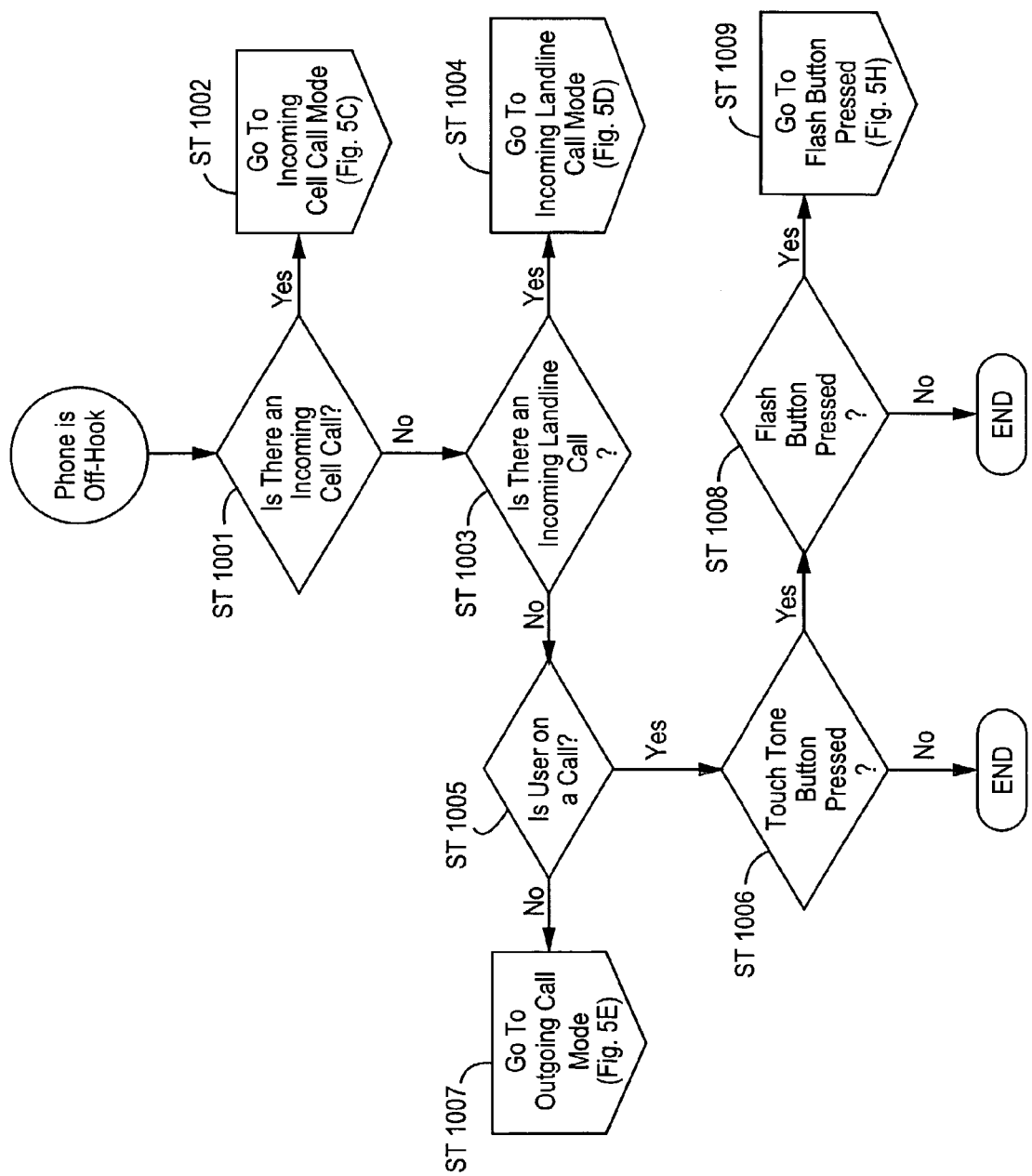

FIG. 5B is a flowchart showing an illustrative Off-Hook routine. This routine is initiated when communication device 102 goes into the off-hook state. For example, the off-hook state may precede the placing or answering of a call or going to a call on hold. The off-hook state is detected by ringing SLIC 20, which provides an off-hook signal to DSP 22. In response to the off-hook signal, DSP 22 executes the Off-Hook routine. At ST 1001, the routine determines whether there is an incoming cell call. If so, the Incoming Cell Call routine (see FIG. 5C) is entered at ST 1002. If not, the routine proceeds to ST 1003 where a determination is made as to whether there is an incoming landline call. If there is an incoming landline call, the Incoming Landline Call routine (see FIG. 5D) is entered at ST 1004. If there is no incoming landline call, the routine continues to ST 1005 where a determination is made as to whether the user is on a call. If the user is not on a call, the Outgoing Call routine (see FIG. 5E) is entered at ST 1007. If the user is on a call, the routine determines at ST 1006 whether a touchtone button is pressed. If no touchtone button is pressed, the Off-Hook routine ends. If a determination is made at ST 1006 that a touchtone button has been pressed, the routine determines at ST 1008 whether the flash button is pressed. If the flash button has been pressed, the Flash Button Pressed routine (see FIG. 5H) is entered at ST 1009. If not, the Off-Hook routine ends.

Figure 5G:
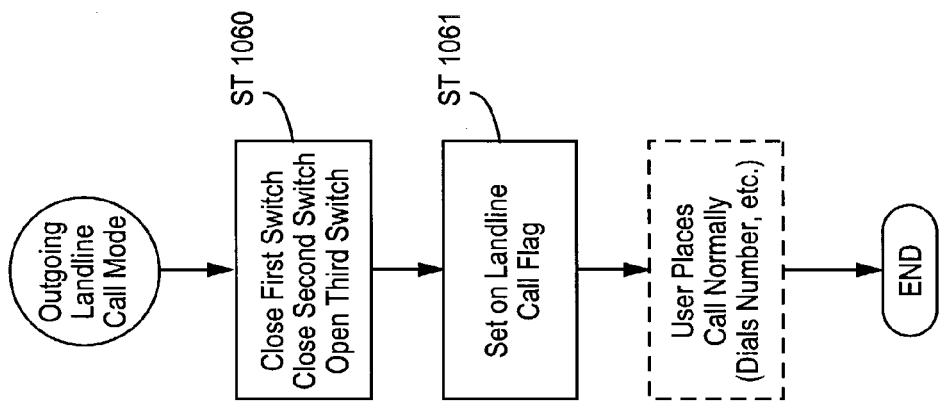
Figure 5D:
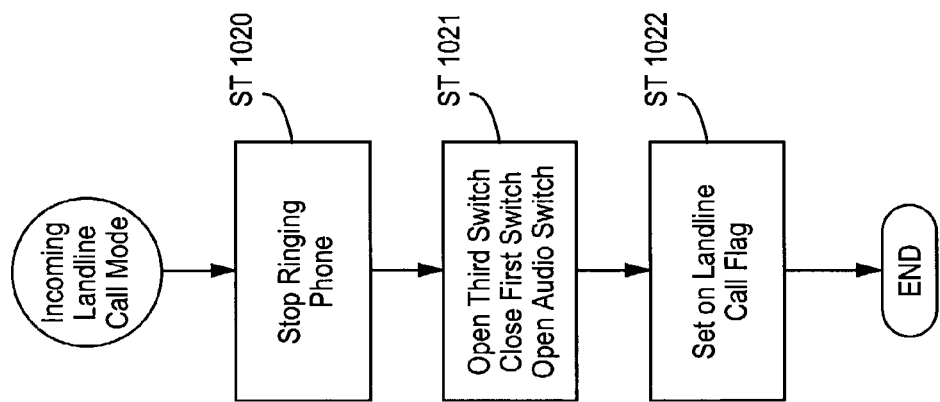
Figure 5C:
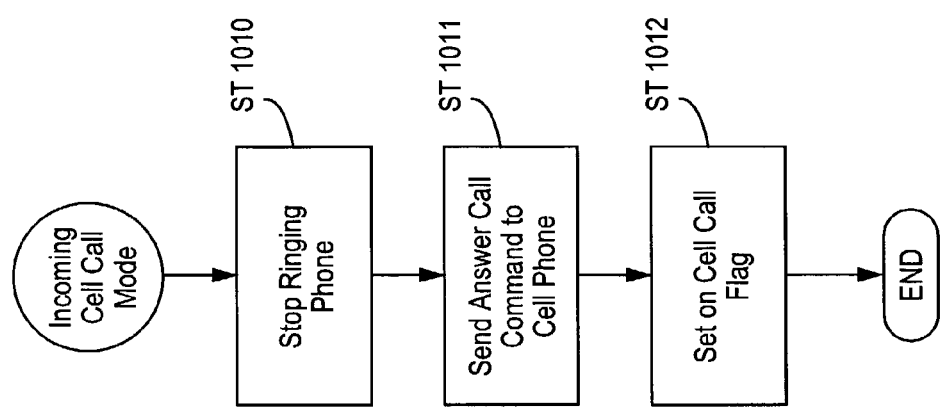

FIG. 5C is a flowchart showing an illustrative Incoming Cell Call routine. This routine is accessed, for example, from the Off-Hook routine of FIG. 5B (i.e., the user has picked up the telephone) when a determination is made that there is an incoming cell call. At ST 1010, the ringing of telephone 102 generated in response to the incoming cell call is stopped. An answer call command is sent to cellular telephone 108 (ST 1011) and an on cell-call flag is set (ST 1012). Thereafter, the routine ends.

FIG. 5D is a flowchart showing an illustrative Incoming Landline Call routine. This routine is accessed, for example, from the Off-Hook routine of FIG. 5B (i.e., the user has picked up the telephone) when a determination is made that there is an incoming landline call. At ST 1020, the ringing of telephone 102 generated in response to the incoming landline call is stopped. Next, at ST 1021, third switch 34 and the audio switch 38 are opened, and first switch 30 is closed. An on landline call flag is then set at ST 1022. Thereafter, the routine ends.

Figure 5E:
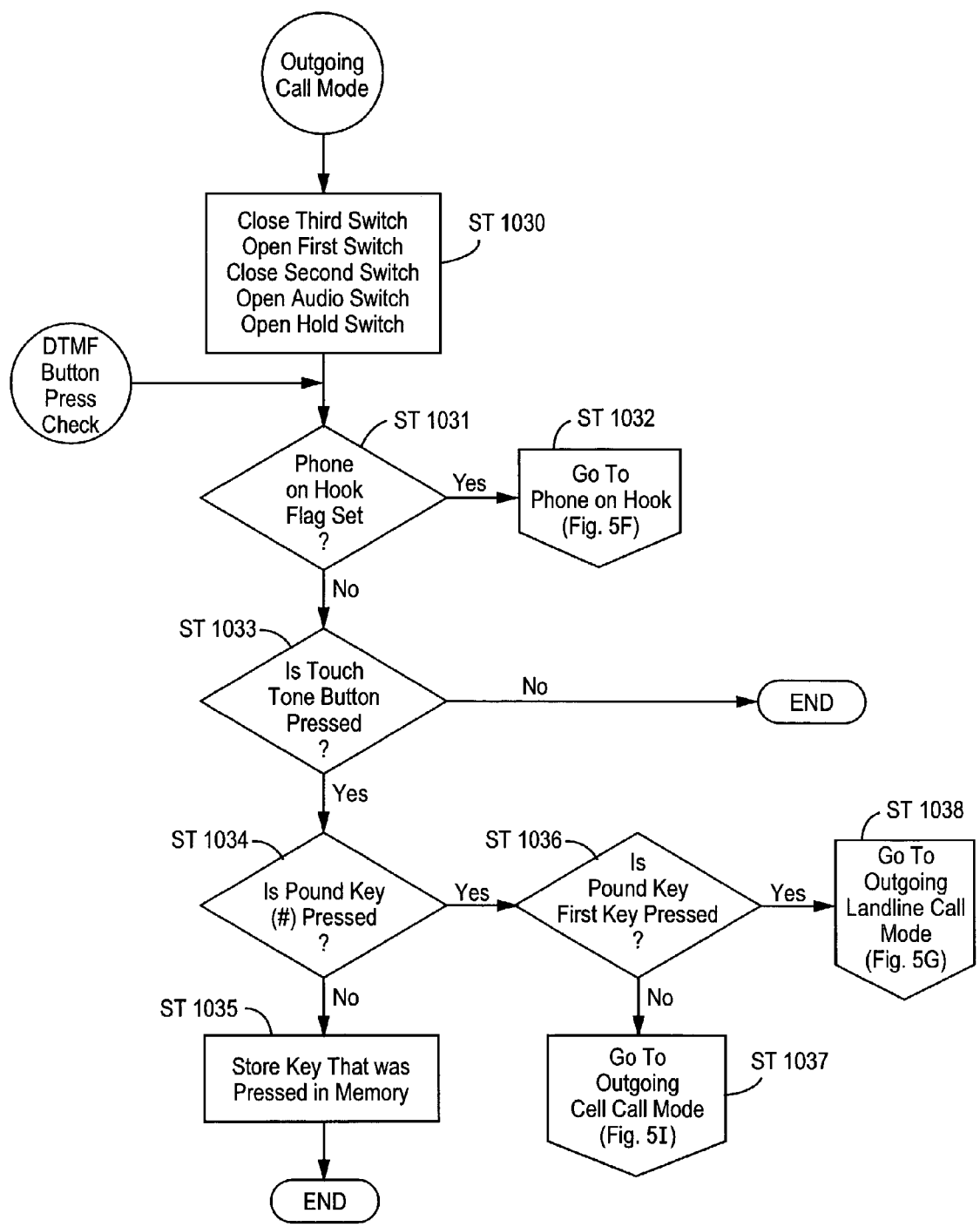

FIG. 5E is a flowchart showing an illustrative Outgoing Call routine. This routine is accessed, for example, from the Off-Hook routine of FIG. 5B (i.e., the user has picked up the telephone) when determinations are made that there is no incoming landline or cellular call and that the user is not currently on a call. At ST 1030, second and third switches 32, 34 are closed and first switch 30, audio switch 38 and hold switch 12 are opened. A determination is made at ST 1031 (which is also the entry point of the DTMF button press check routine) as to whether the phone on-hook flag is set. If so, the routine proceeds to ST 1032 where the Phone On-Hook (see FIG. 5F) routine is carried out. If not, a determination is made at ST 1033 as to whether a touchtone button has been pressed. If no touchtone button has been pressed, the routine ends. If a touchtone button has been pressed, the routine proceeds to ST 1034 where a determination is made as to whether a predetermined key has been pressed. For purposes of the discussion herein, the predetermined key will be the "#" key, although the invention is not limited in this respect. If the "#" key has not been pressed, the routine continues to ST 1035 where the key that was pressed is stored in memory. The routine then ends. If the "#" key has been pressed, the routine continues to ST 1036 where a determination is made as to whether the "#" key is the first key pressed. If the "#" key is not the first key pressed, the Outgoing Cell Call routine (see FIG. 5I) is entered at ST 1037. If the "#" key is the first key pressed, the Outgoing Landline routine is entered at ST 1038. In short, if the "#" key is pressed before the user enters a telephone number, the communication device is connected to line pair 104 and the user can thereafter enter a telephone number to make a landline call. If the "#" key is pressed after the user enters a telephone number, an outgoing cell call is initiated via cellular communication device 108 using the entered telephone number.

Figure 5F:
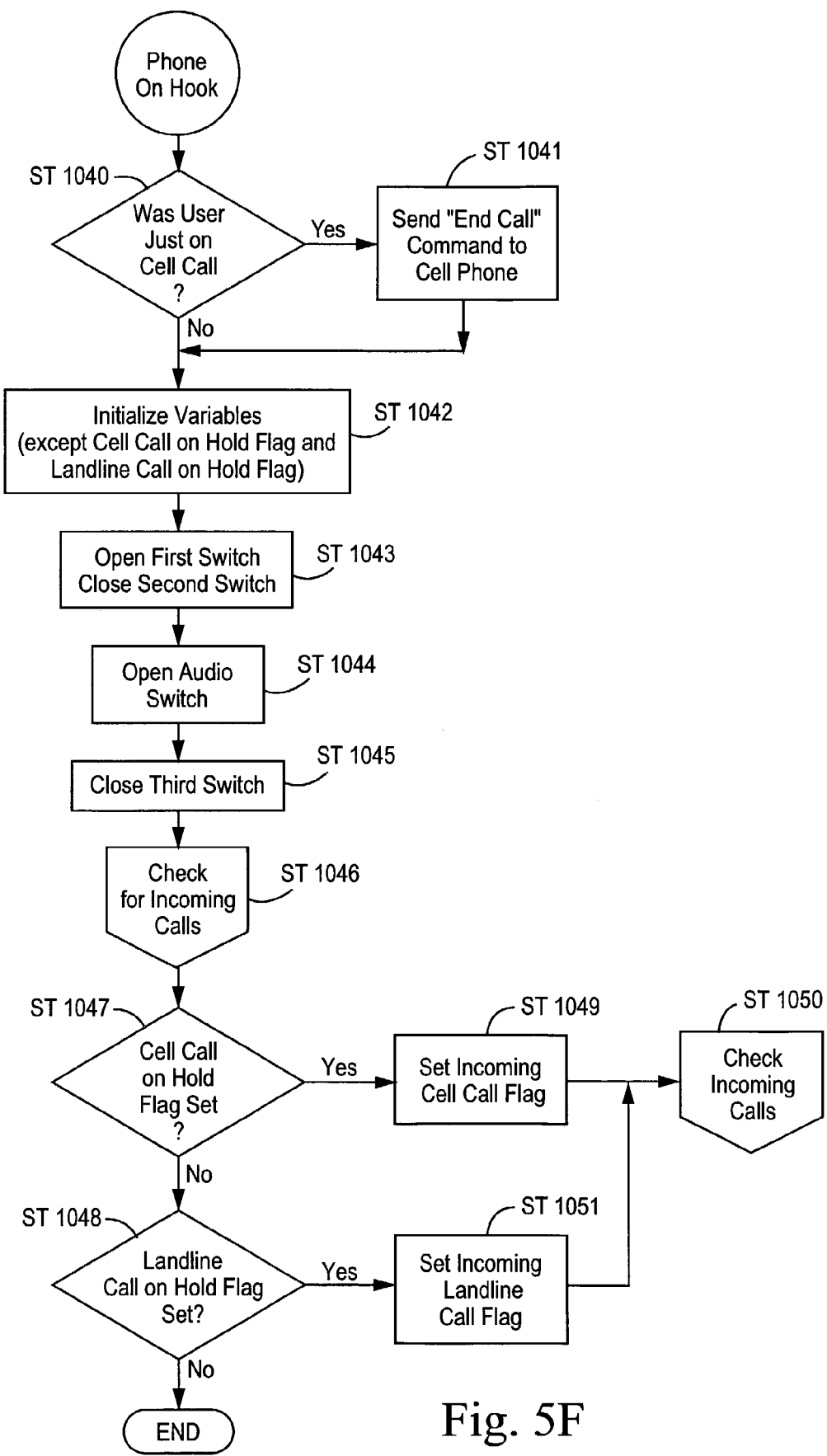

FIG. 5F is a flowchart showing an illustrative Phone On-Hook routine. At ST 1040, a determination is made as to whether the user was just on a cell call. If not, the routine continues to ST 1042. If so, an "End Call" command is sent to the cellular telephone at ST 1041 and the routine thereafter proceeds to ST 1042. At ST 1042, all flags except the "cell call on hold" and "landline call on hold" flags are cleared and then first switch 30 is opened and second switch 32 is closed at ST 1043. The routine then continues to ST 1044 and ST 1045 at which audio switch 38 is opened and third switch 34 is closed, respectively. The routine then checks for incoming calls at ST 1046. A determination is made at ST 1047 as to whether the cell call on hold flag is set and, if not, a determination is made at ST 1048 as to whether the landline call on hold flag is set. If the cell call on hold flag is set, the incoming cell call flag is set at ST 1049 and incoming calls are checked at ST 1050. If the landline call on hold flag is set at ST 1048, the incoming landline call flag is set at ST 1051 and incoming calls are checked at ST 1050. If the landline call on hold flag is determined not to be set at ST 1048, the routine ends.

FIG. 5G is a flowchart showing an illustrative Outgoing Landline Call routine. This routine is accessed, for example, from the Outgoing Call routine of FIG. 5E if a determination is made that a landline call is to be made. At ST 1060, the routine closes first and second switches 30, 32 and opens third switch 34. The routine then continues to ST 1061 at which the landline call flag is set. At this point, the communication device is connected to line pair 104 and the user places a landline call in the normal way. Thereafter, the routine ends. While on a landline call, keypresses by the user are ignored.

Figure 5H:
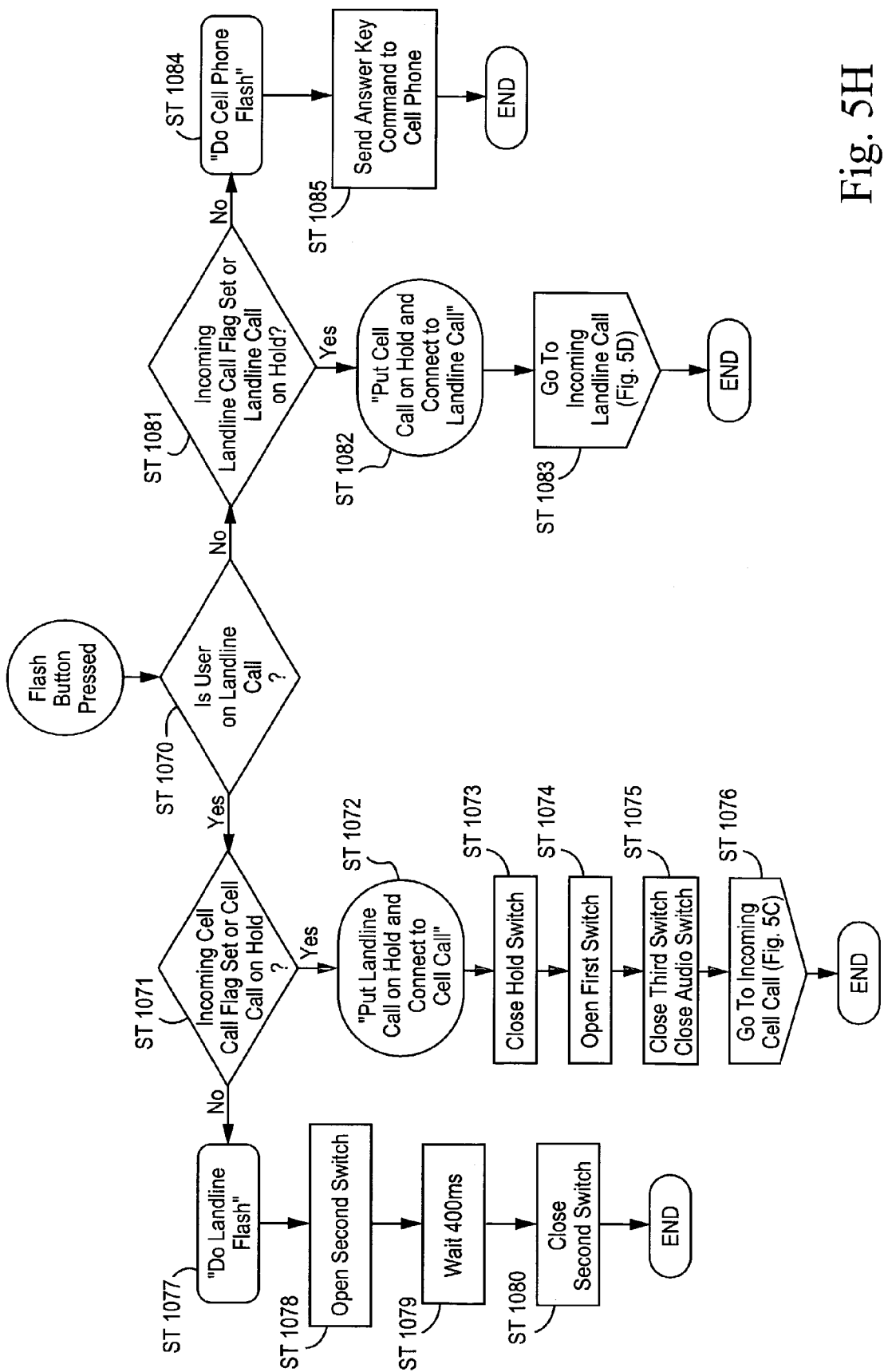

FIG. 5H is a flowchart showing an illustrative Flash Button Pressed routine. At ST 1070, the routine determines whether the user is on a landline call. If so, the routine proceeds to ST 1071 where a determination is made as to whether the incoming cell call flag or the cell call on hold flag is set. If so, the routine proceeds to put the landline call on hold and connect to the cell call (ST 1072) by closing hold switch 12 (ST 1073), opening first switch 30 (ST 1074) and closing third switch 34 and audio switch 38 (ST 1075). The routine then proceeds to the Incoming Cell Call (see FIG. 5C) at ST 1076. If the incoming cell call flag and the cell call on hold flags are not set at ST 1071, the routine then performs a landline flash (ST 1077) by opening second switch 32 (ST 1078), waiting 400 milliseconds (ST 1079) and then closing second switch 32 (ST 1080). If the routine determines at ST 1070 that the user is not on a landline call, the routine proceeds to ST 1081 where a determination is made as to whether the incoming landline call flag or the landline call on hold flag is set. If so, the routine proceeds to put the cell call on hold and connect to the landline call (ST 1082) and then goes to the—Incoming Landline Call routine (see FIG. 5D) at ST 1083. If the incoming landline call flag and the landline call on hold flags are not set at ST 1081, the routine does a cell phone flash (ST 1084) by sending an answer key command to the cellular telephone (ST 1085).

Figure 5I:
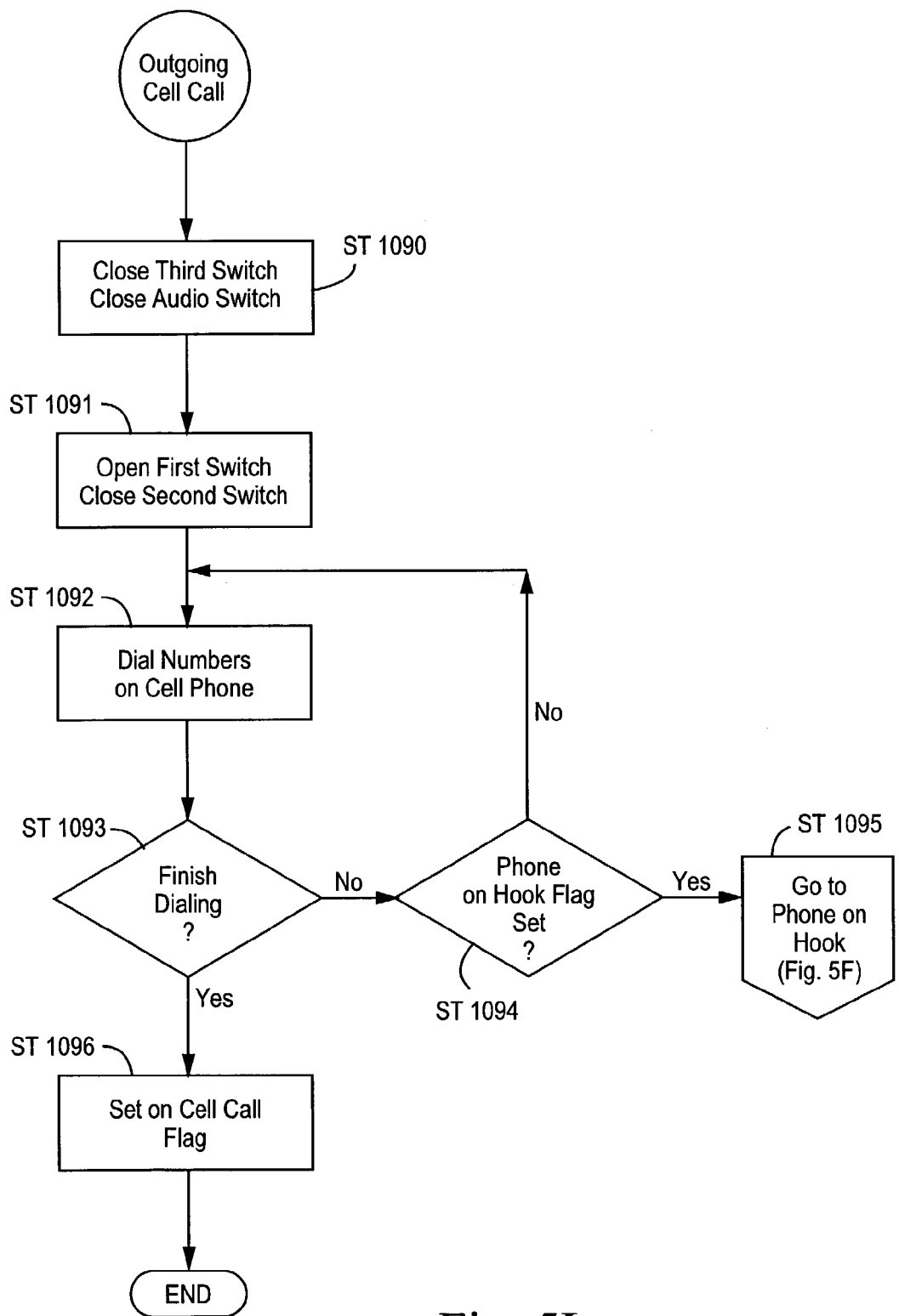

FIG. 5I is a flowchart showing an illustrative Outgoing Cell Call routine. This routine is accessed, for example, from the Outgoing Call routine of FIG. 5E if a determination is made that a cell call is to be made. At ST 1090, the routine closes third switch 34 and audio switch 38. First switch 30 is opened and second switch 32 is closed at ST 1091. The routine then dials the numbers stored at ST 1035 in FIG. 5E on the cell phone at ST 1092. If dialing is not finished at ST 1093, a determination is made at ST 1094 as to whether the phone on-hook flag is set. If not, the routine returns to ST 1092 to continue dialing the numbers on the cell phone. If the on-hook flag is set, the Phone On-Hook routine (see FIG. 5F) is entered at ST 1095. If the dialing is finished at ST 1093, the on cell call flag is set (ST 1096) and the routine ends.

Figure 5J:
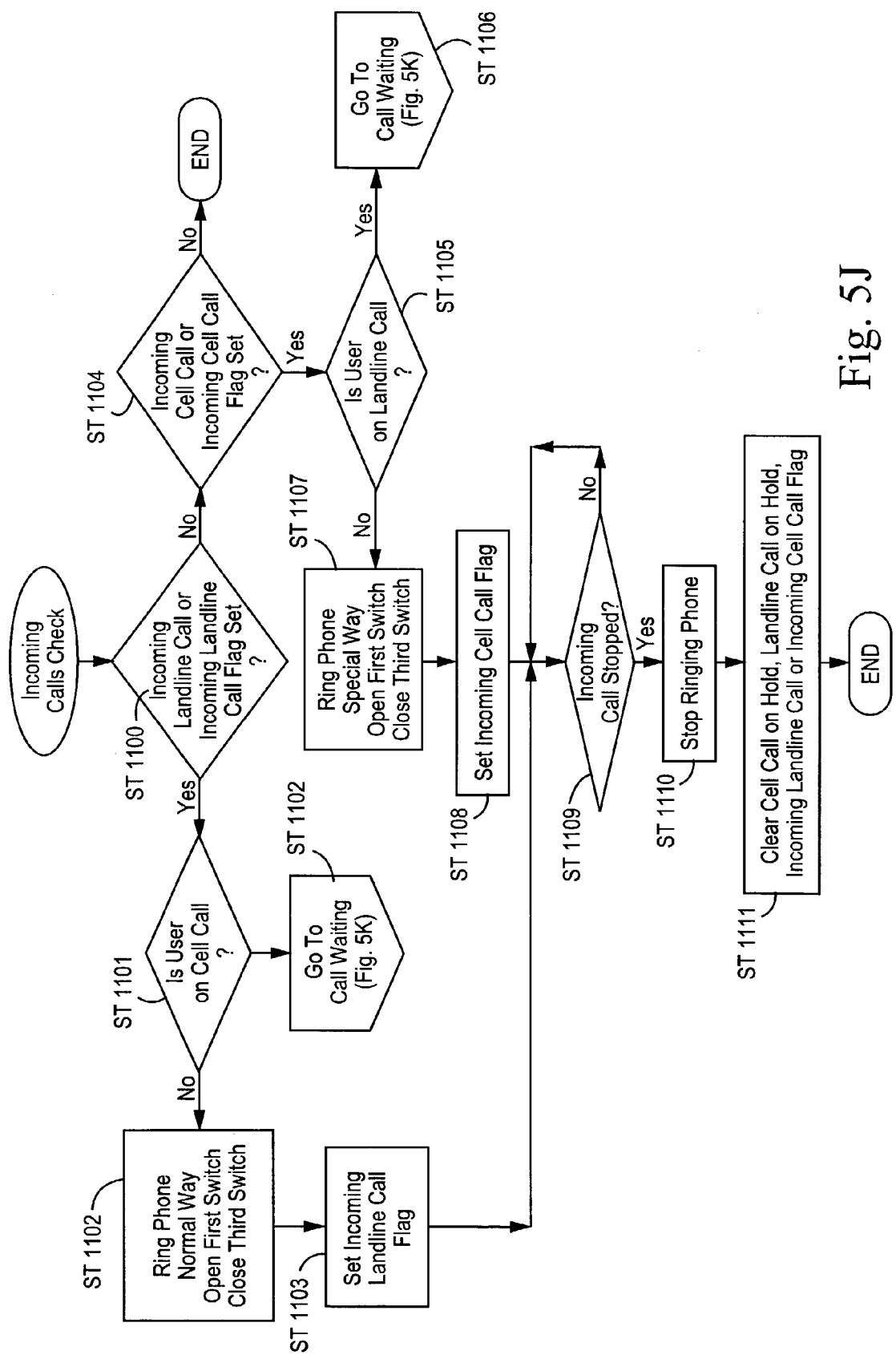

FIG. 5J is a flowchart showing an illustrative Incoming Calls Check routine. At ST 1100, the routine determines whether there is an incoming landline call or whether the incoming landline call flag is set. The determination of whether there is an incoming landline call is made by checking the hardware (e.g., the voltages on line pair 104). If either condition is satisfied at ST 1100, the routine proceeds to ST 1101 where a determination is made as to whether the user is on a cell call. If so, the Call Waiting routine (see FIG. 5K) is entered (ST 1102). If the user is not on a cell call, the routine rings the telephone normally, opens first switch 30 and closes third switch 34 (ST 1102). The incoming landline call flag is then set at ST 1103 and the routine proceeds to ST 1109. If neither condition is satisfied at ST 1100, the routine determines whether there is an incoming cell call or whether the incoming cell call flag is set at ST 1104. To determine whether there is an incoming cell call, the signal level on the audio pin of the cellular telephone's data connector may be compared to a predetermined level. If the signal level exceeds this predetermined level, an incoming cell call is determined to be present. In an alternative implementation, DSP 22 may be responsive to an incoming cell call signal provided via telephone's data connector over bus 48. If the determination at ST 1104 is "NO", the routine ends. If the determination at ST 1104 is "YES", the routine proceeds to ST 1105 where a determination is made as to whether the user is on a landline call. If so, the Call Waiting routine (see FIG. 5K) is entered at ST 1106. If not, the routine rings the telephone, opens first switch 30 and closes third switch 34 (ST 1107). Preferably, the ring at ST 1107 is different than the ring for an incoming landline call. This enables the user to know before answering that the incoming call is a cell call. At ST 1108, the incoming cell call flag is set and the routine then proceeds to ST 1109. At ST 1109, the routine continuously checks whether the incoming call is stopped. If so, the ringing of the telephone is stopped at ST 1110 and the cell call on hold flag, the landline on hold flag, the incoming landline call flag or the incoming cell call flag is cleared at ST 1111.

Figure 5K:
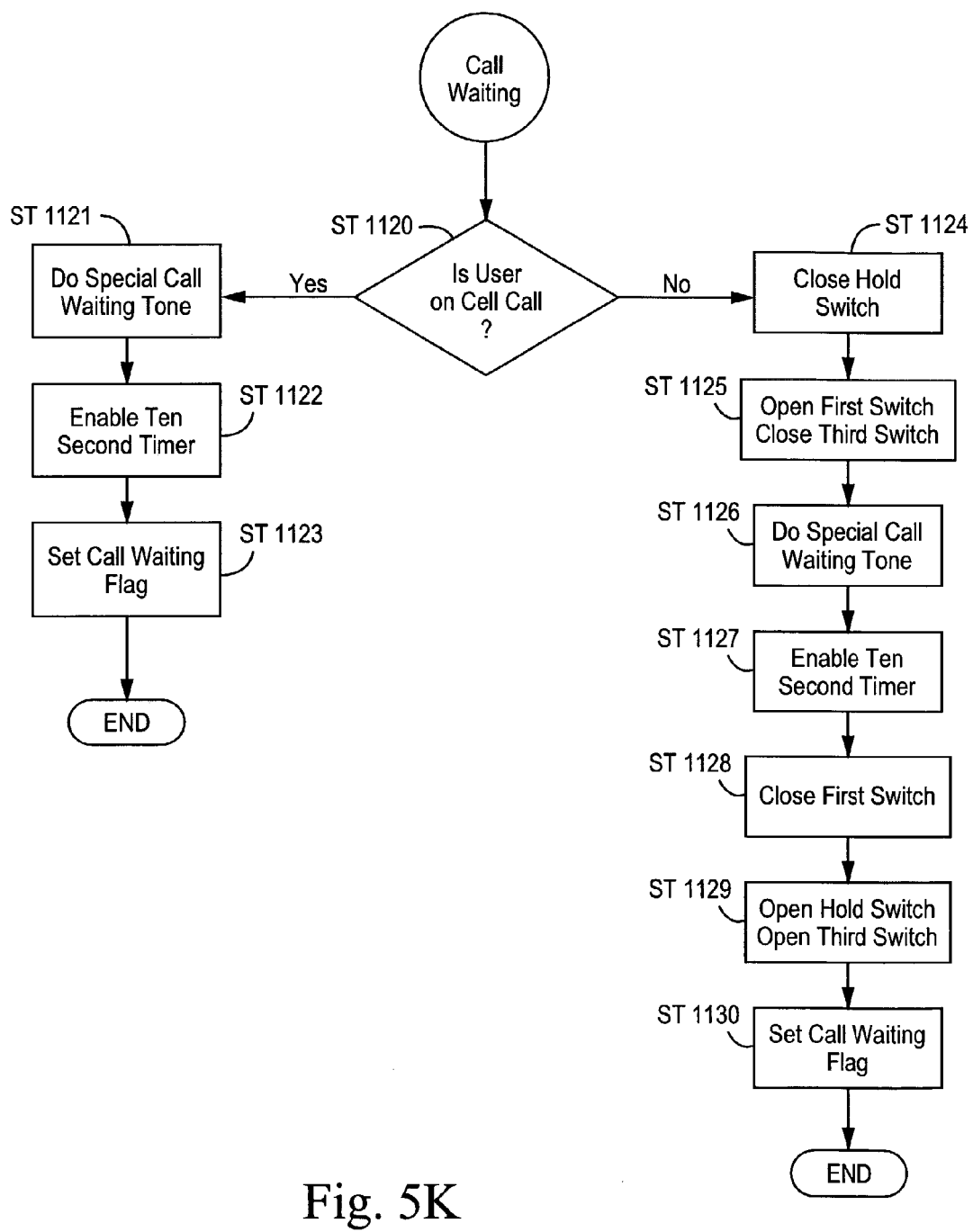

FIG. 5K is a flowchart showing an illustrative Call Waiting routine. At ST 1120, the routine checks whether the user is on a cell call. If so, the routine generates a special call waiting tone (ST 1121), enables the Ten Second Timer routine (ST 1122), and sets a call waiting flag (ST 1123). Thereafter, the routine ends. The normal call waiting tone is 440 Hz. In order to allow the user to determine the type of call waiting while he/she is on the telephone, the user will hear a 1500 Hz tone. Hearing this tone, which is significantly different than the normal call waiting tone, will tell the user that another type of call is waiting. If the user is not on a cell call, the routine closes the hold switch 12 at ST 1124 and then opens first switch 30 and closes third switch 34 at ST 1125. A special call waiting tone is generated at ST 1126 and the Ten Second Timer routine is enabled at ST 1127. First switch 30 is then closed at ST 1128 and hold switch 12 and third switch 34 are opened at ST 1129. The call waiting flag is set at ST 1130 and thereafter the routine ends.

Figure 5L:
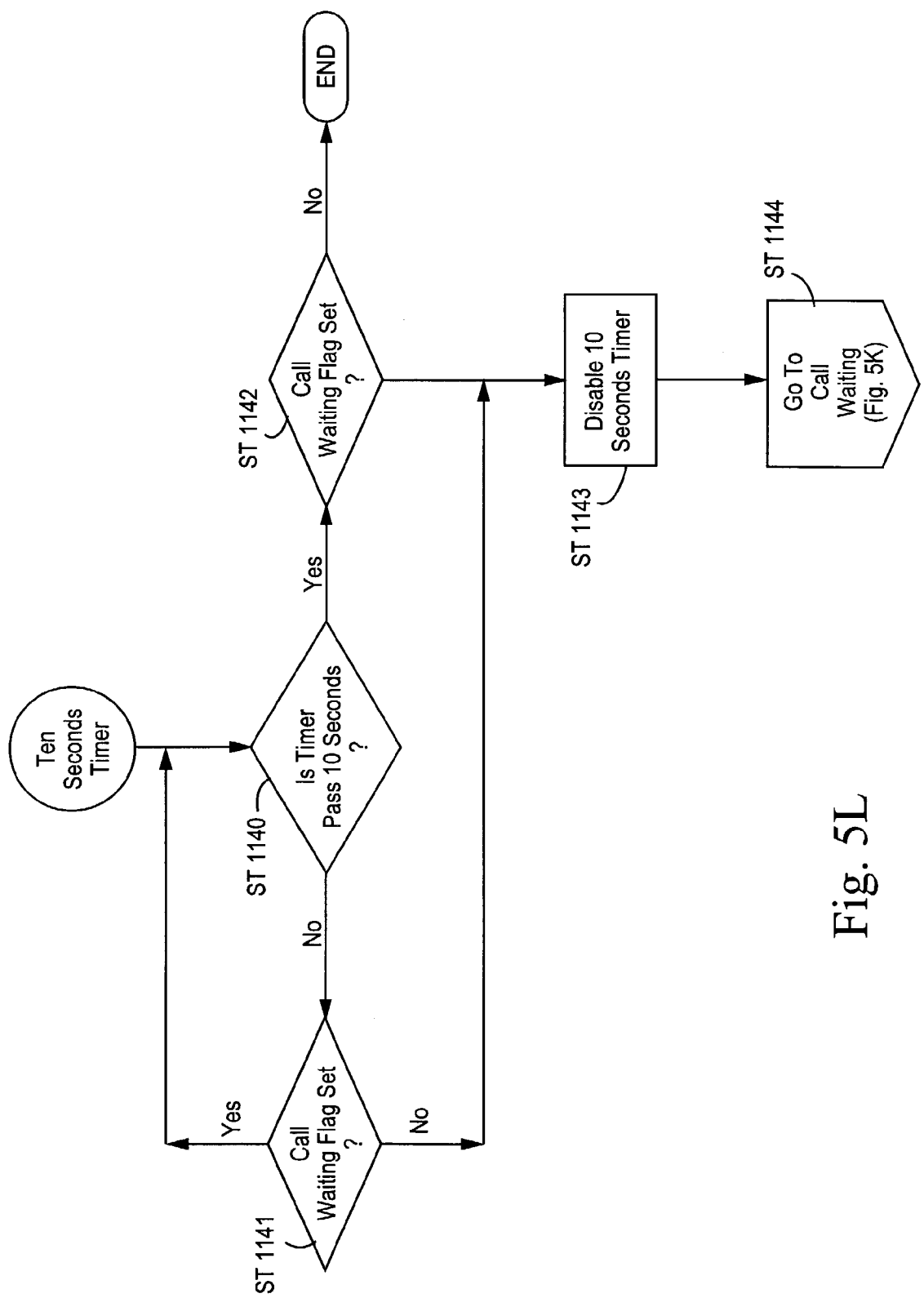

FIG. 5L is a flowchart showing an illustrative Ten Second Timer routine. The routine first checks whether ten seconds have passed at ST 1140. If not, the routine determines whether the call waiting flag is set at ST 1141. If so, the routine returns to ST 1140 to determine whether ten seconds have passed. If not, the routine proceeds to ST 1143. If the routine determines at ST 1140 that ten seconds have passed, a check is made as to whether the call waiting flag is set at ST 1142. If not, the routine ends. If so, the routine proceeds to ST 1143 where the timer is disabled and to ST 1144 where the Call Waiting routine is entered.

Figure 6:
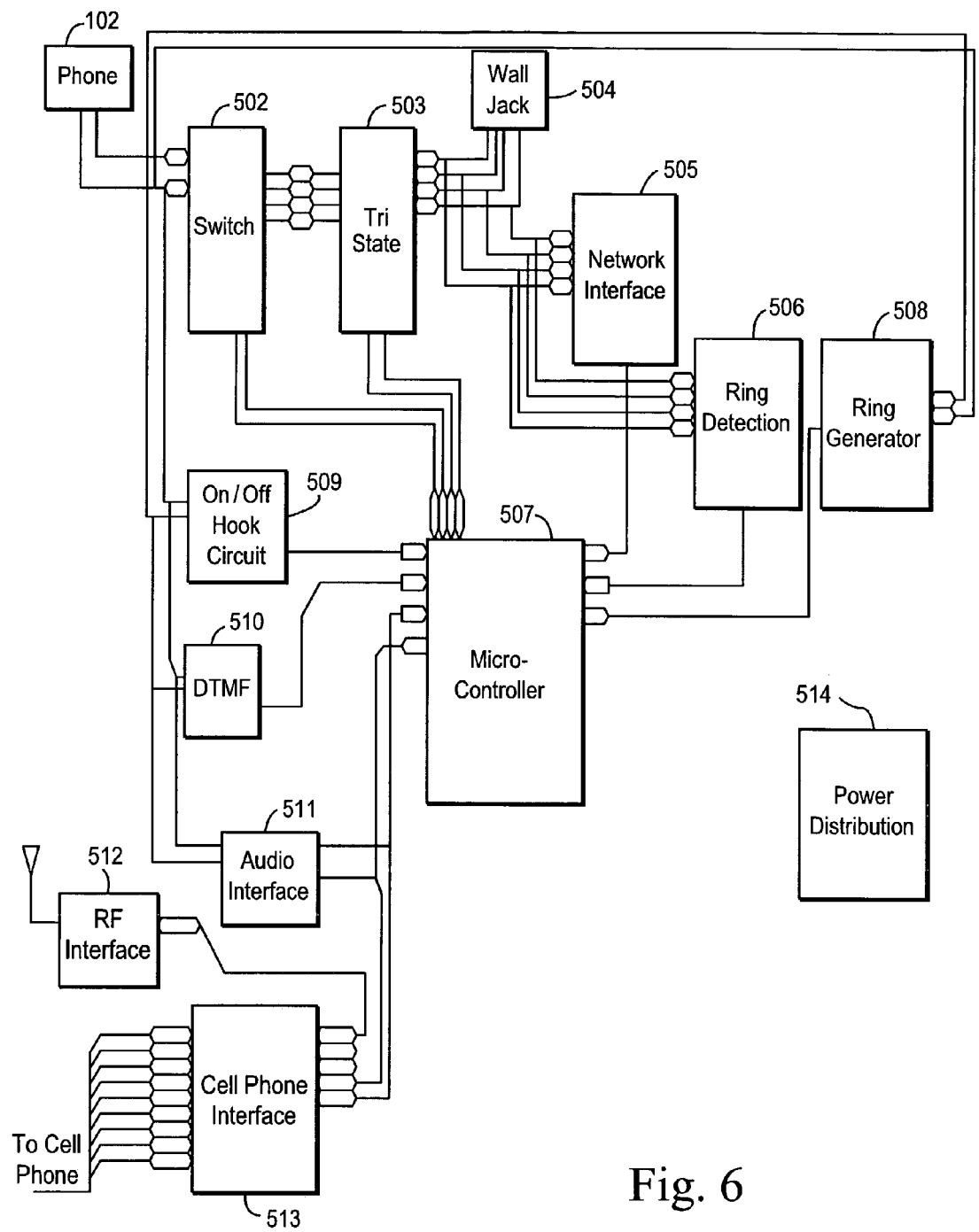
FIG. 6 is a functional block diagram of an example implementation of interface circuitry.

FIG. 6 is a functional block diagram of an example implementation of interface circuitry. In this example, the interface circuitry is configured to connect the communication device for a wireless call in response to the input of a predetermined code (e.g., *32) and otherwise connect the communication device for a PSTN call. Communication device 102 is an ordinary cord or cordless telephone that may be located in a home or office. Switch 502 is an electronic switch for connecting and disconnecting the telephone from the PSTN. Tri-state 503 is an electronic switch that places the phone line in a high impedance state. Wall jack 504 is a standard RJ11 wall jack found in homes and offices. Network interface 505 is circuitry that interfaces the system to the PSTN. This interface complies with all FCC regulations for attaching electronic equipment to the PSTN. When the communication device 102 is in use by the user, the network interface 505 places the proper voltages, resistances and impedances on the telephone line of the PSTN. This keeps the telephone available for incoming and outgoing calls. Ring detector 506 detects incoming calls from the PSTN and provides an incoming call detection signal to the microcontroller 507. Ring generator 508 rings the communication device 102 when an incoming cellular call is detected. Microcontroller 507 provides the overall control of the interface circuitry. On/off-hook circuit 509 detects when the communication device 102 is on-hook (i.e., not in use) and off-hook (i.e., in use). This circuit sends on-hook and off-hook signals to microcontroller 507 as appropriate. DTMF circuit 510 detects and decodes the buttons pressed by the user on communication device 102 and provides this information to microcontroller 507. Audio interface 511 selectively provides an audio path between the cellular phone and communication device 102. RF interface 512 contains a very sensitive RF antenna that is capable of detecting and capturing very weak cellular signals. RF interface 512 increases the sensitivity/signal range of the cellular telephone that is connected to the system. Cell phone interface 513 connects the cellular telephone to the interface circuitry so that calls, data, audio, etc. can be sent to and received from the cellular telephone. Power distribution system 514 connects to all the elements shown in FIG. 6. The power distribution system controls, regulates and distributes power to these elements.

Figure 7A:
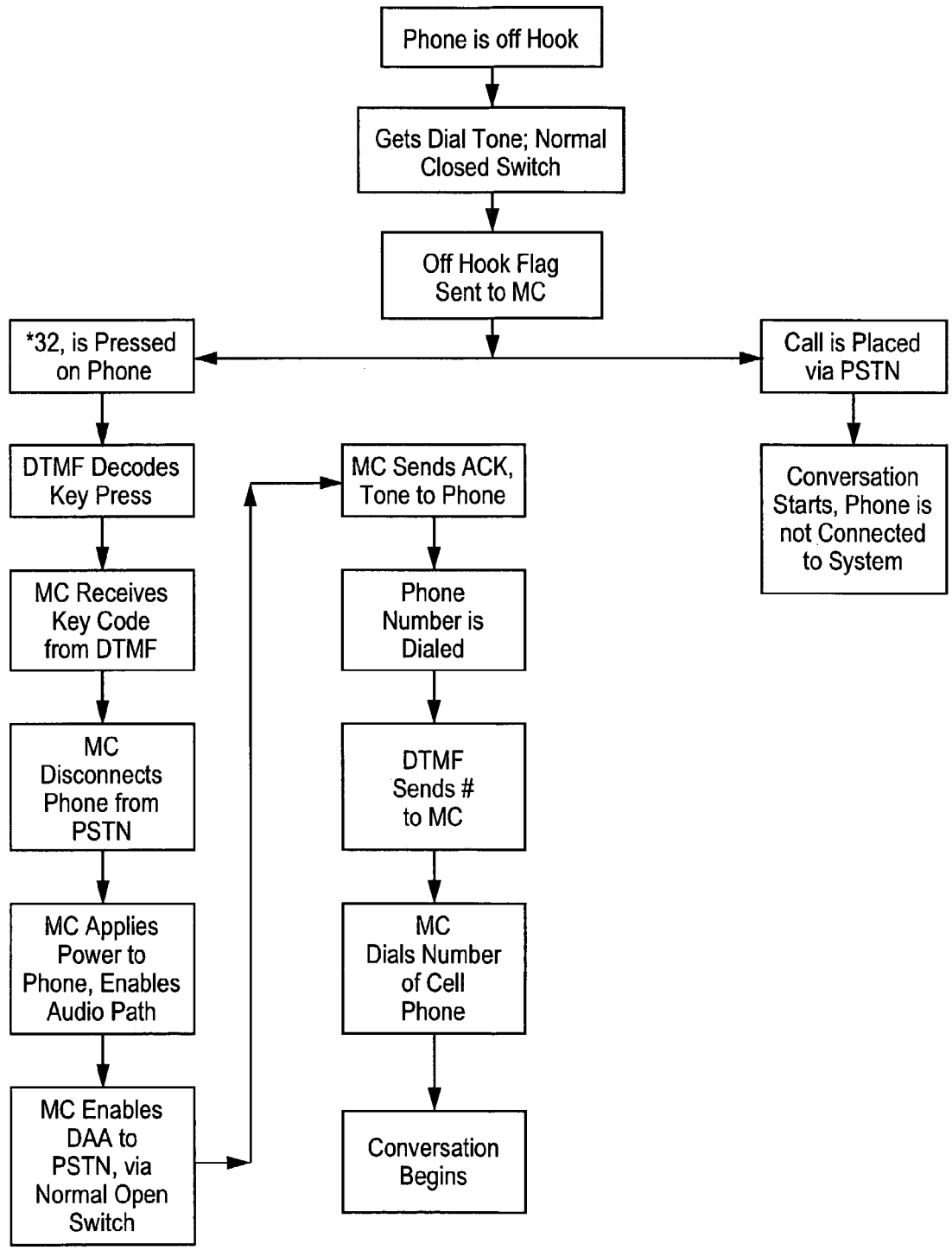
FIGS. 7A-7F are flowcharts illustrating example operations involving the interface circuitry shown in FIG. 6.
Figure 7B:
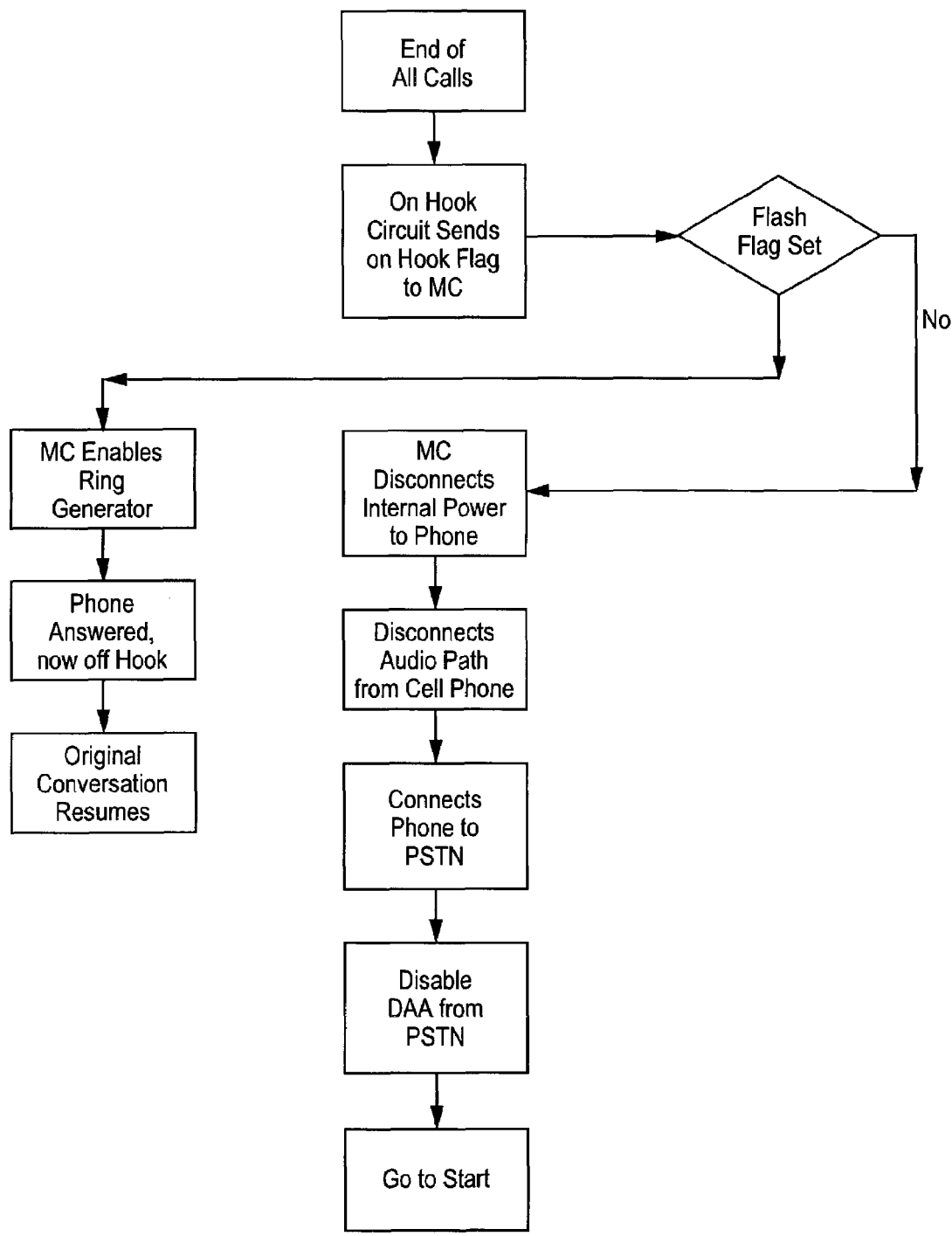
Figure 7C:
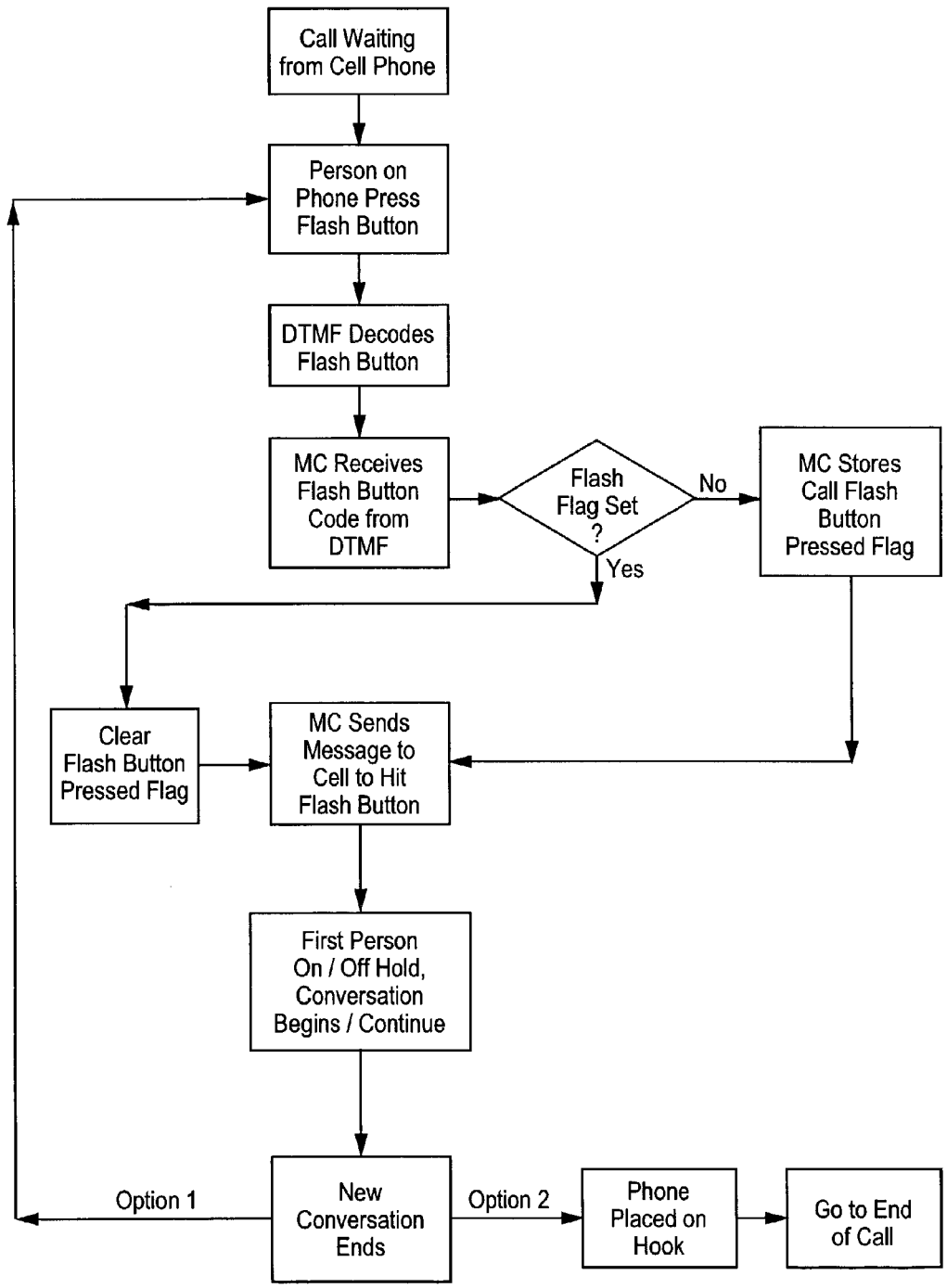
Figure 7D:
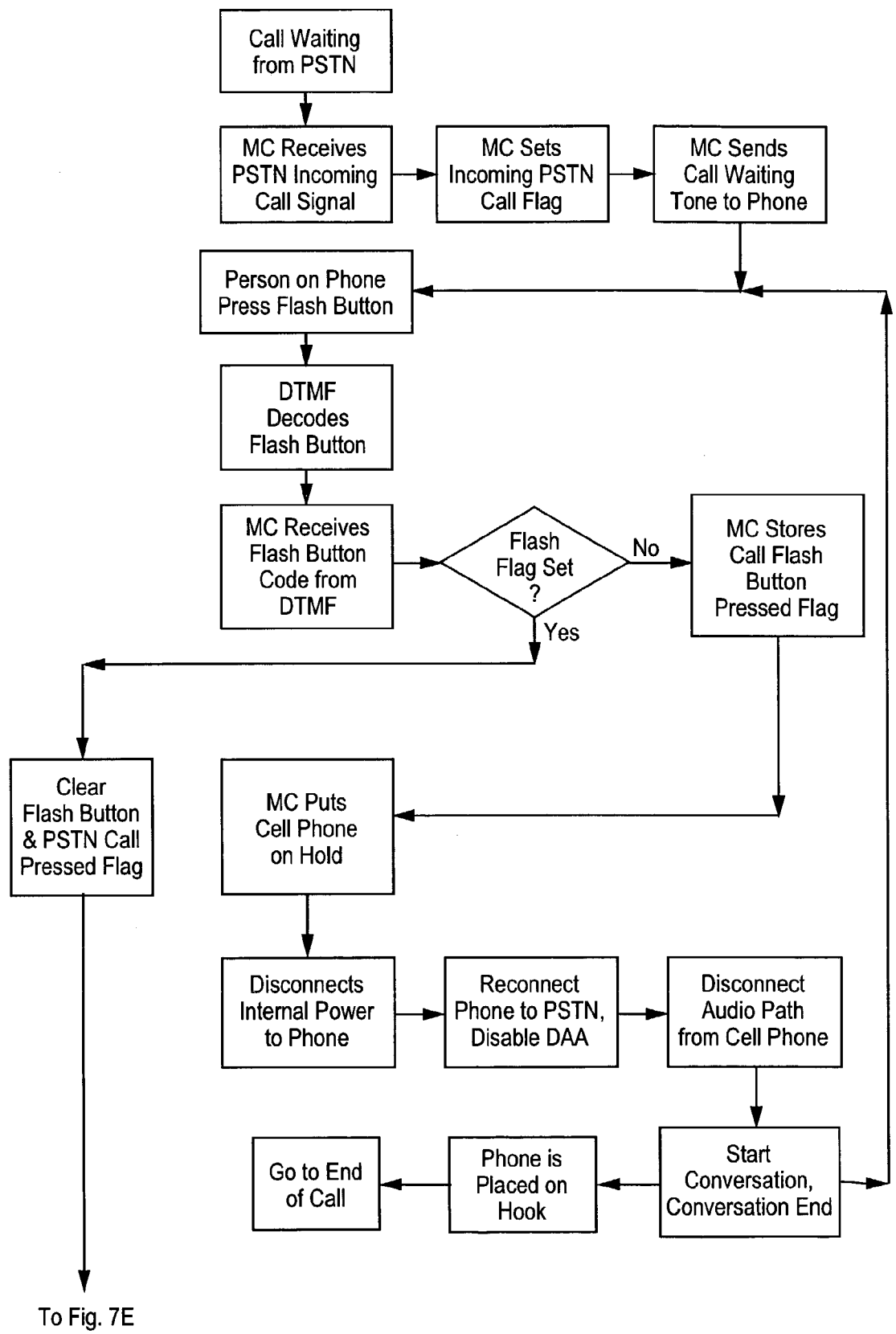
Figure 7E:
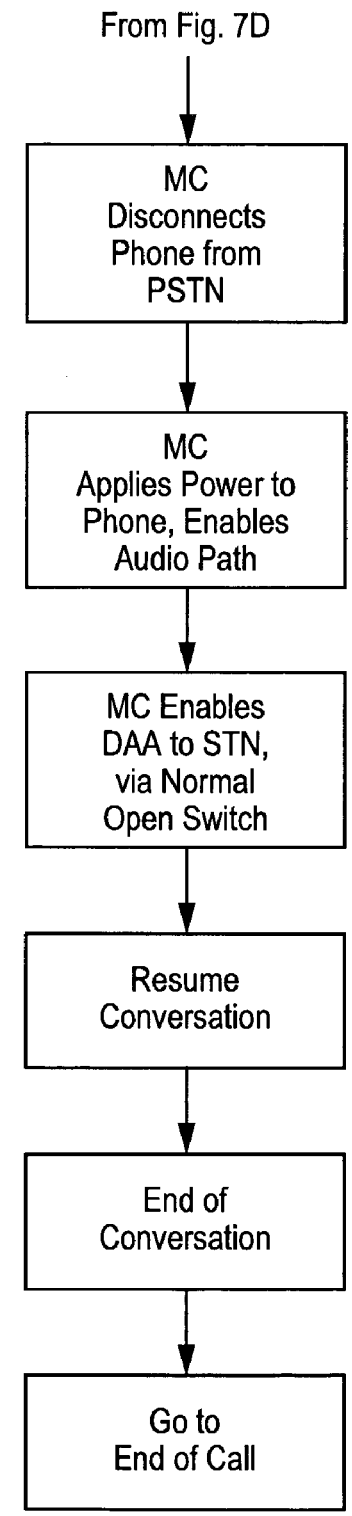
Figure 7F:
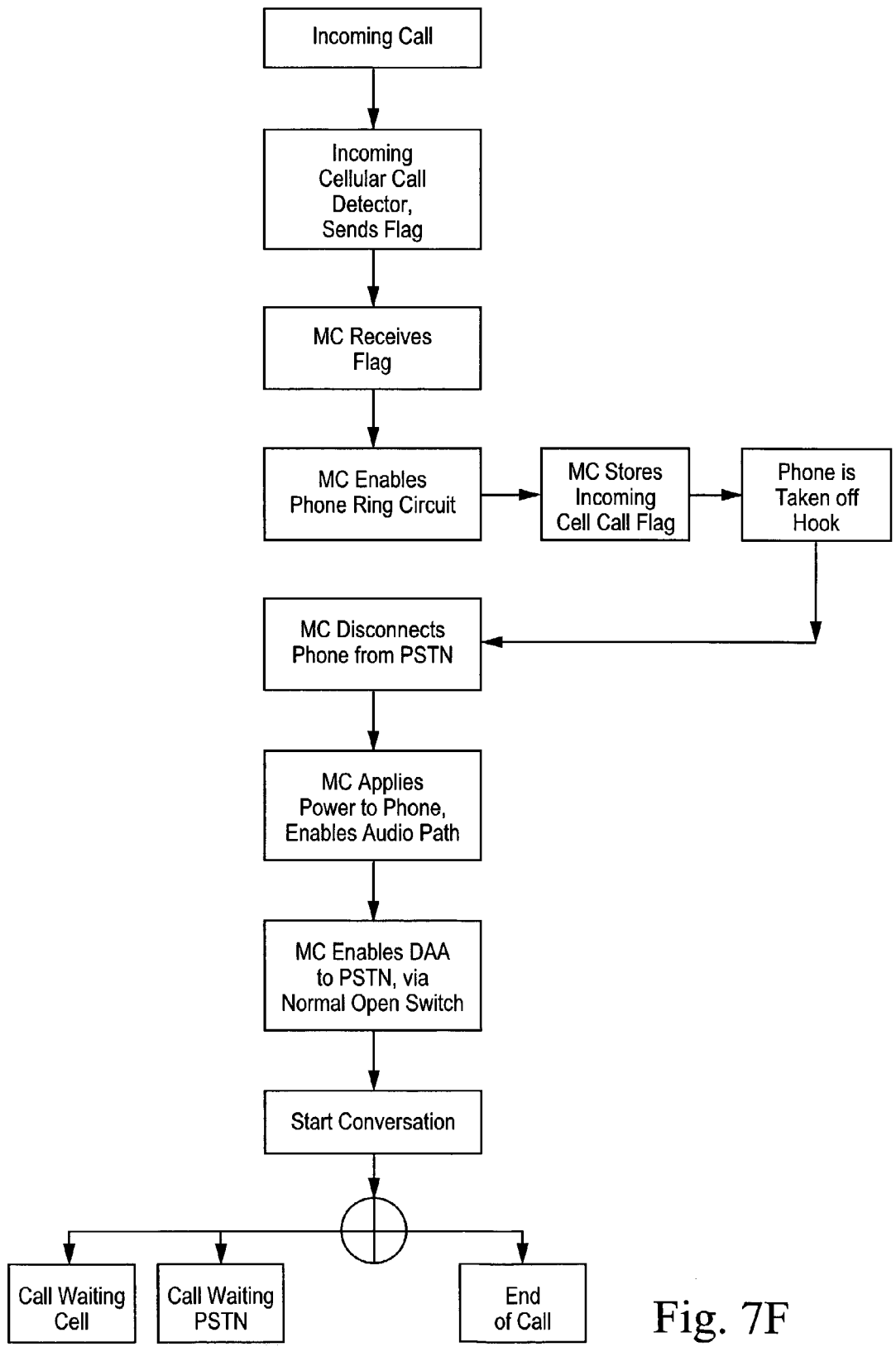

FIGS. 7A-7F are flowcharts illustrating example operations involving the interface circuitry shown in FIG. 6. FIG. 7A shows example operations that occur when the telephone goes into the off-hook state. FIG. 7B shows example operations that occur at the end of all calls. FIG. 7C shows example operations that occur when a cell call is received while the user is on a landline call. FIGS. 7D and 7E show example operations that occur when a landline call is received while the user is on a cell call. FIG. 7F shows example operations that occur when there is an incoming call. Additional description of these flowcharts is provided in Application No. 60/394,283, filed Jul. 9, 2002, the contents of which are incorporated herein in their entirety.

Figure 8:
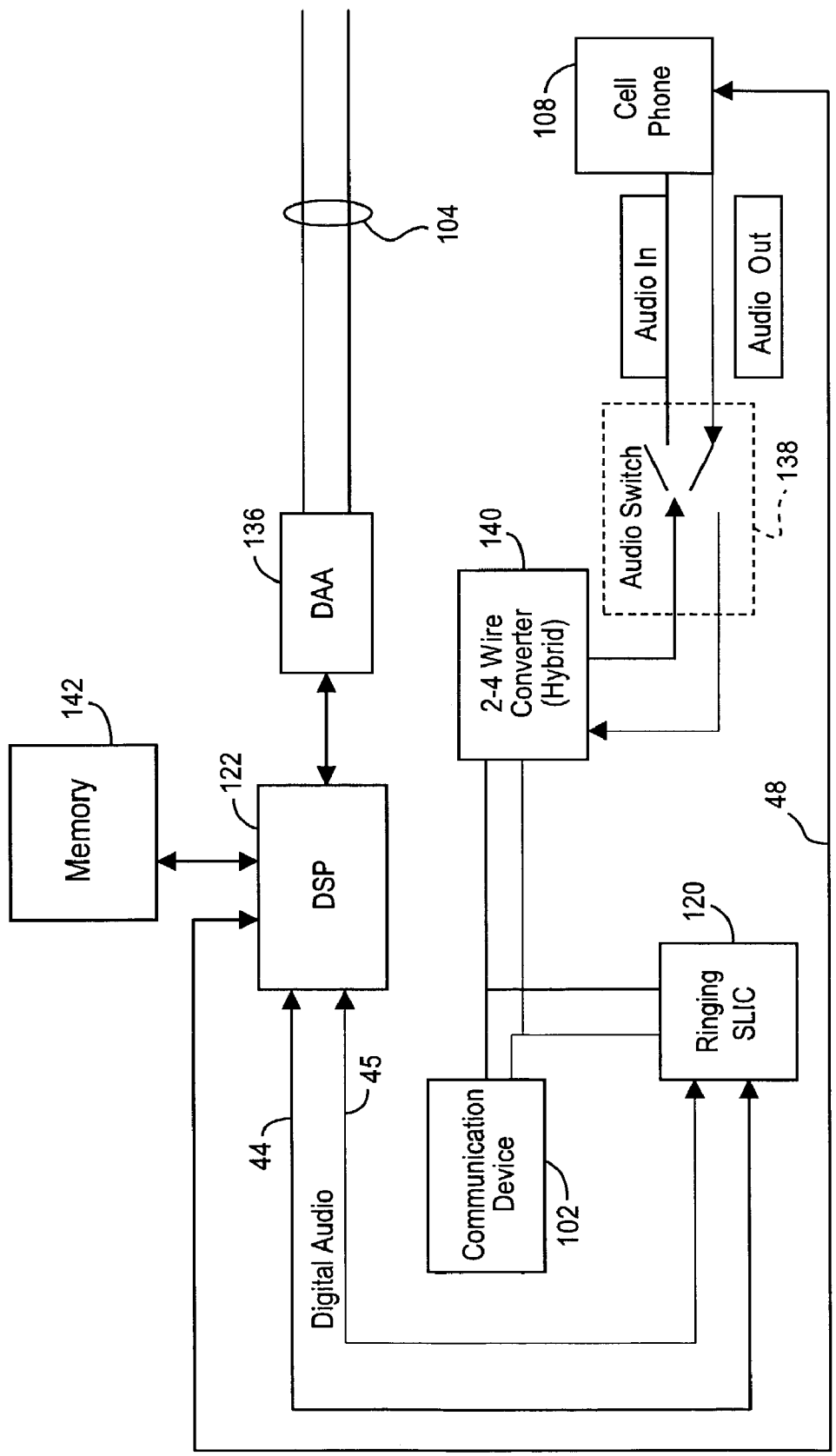
FIG. 8 is a circuit block diagram of another example of interface circuitry 106.

FIG. 8 is a circuit block diagram of another example of interface circuitry 106. In this example, interface circuitry 106 does not use hardware switches and the switching is done in software by compressed digital audio as opposed to the raw analog audio signal. The functionality of the FIG. 8 interface circuitry is the same as that of the FIG. 2 interface circuitry; however, the FIG. 8 interface circuitry provides more robustness. For example, the FIG. 8 interface circuitry converts all audio to a digital format, which allows the audio signals to be enhanced using conventional digital signal processing techniques. For example, if the audio to/from line pair 104, communication device 102, and/or the cellular phone 108 is unclear or noisy, DSP 122 can remove this unwanted noise from the audio signal. The audio from line pair 104 can be digitized by DAA 136, and the audio from communication device 102 and cellular telephone 108 can be digitized by ringing SLIC 120. In the following description, communication device 102 is assumed to be a telephone, although, as noted above, the invention is not limited in this respect.

The user makes a landline call as follows. First, the user picks up the telephone (i.e., places the telephone in an off-hook state) and enters a predetermined code for a landline call. The user then dials the telephone number of the called party. Ringing SLIC 120 detects the numbers being dialed and sends this information to DSP 122. DSP 122 instructs DAA 136 to go off hook, and DAA 136 dials the telephone number of the called party. If the called party answers, DAA 136 captures, digitizes and compresses the audio from the called party that is communicated over landline 104. This compressed digital data is communicated DSP 122. DSP 122 can optionally process the compressed digital data using digital audio techniques such as audio quality enhancement. DSP 122 sends the digital audio to ringing SLIC 120 via a digital audio data bus 45 (e.g., a PCM serial bus). Although busses 44 and 45 are shown separately, they may be provided as a single bus in another implementation. Ringing SLIC 120 decompresses the audio and converts the digital signal back into analog audio signals, which are then supplied to the telephone so that the user can hear them.

Analog audio from the calling party is supplied to ringing SLIC 120, which digitizes and compresses the audio and communicates the digital audio signal to DSP 122 over the digital audio path. DSP 122 can optionally utilize digital audio processing techniques on the digital audio to, for example, provide audio enhancement. The digital audio signal output from DSP 122 is supplied to DAA 136, which decompresses the audio and converts the digital signal to an analog signal that is then transmitted to the called party via line pair 104.

To make a cellular call from the telephone, the user follows the steps discussed above with respect to the interface circuitry of FIG. 2A. Call conferencing between cellular and landline calls may be accomplished by connecting both DAA 136 and cellular phone 108 to ringing SLIC 120 simultaneously.

The above-described arrangements also advantageously permit data other than audio data to be sent from wireless communication device 108 to communication device 102. For example, the names and associated telephone numbers that are stored in a cellular telephone phonebook may be stored into memory (such as memory 42) each time a cellular telephone is connected to the interface circuitry (e.g., by being placed in cradle 214 in FIG. 4). These names and telephone numbers may be stored using the Caller ID (CID) protocol and forwarded to a CID-enabled communication device 102 for viewing. This protocol is described in documents such as Calling Identity Delivery On Call-Waiting, TR-NWT-000575; Caller Identification With Call Waiting: Request for Information From Customer Premises Equipment Suppliers, RFI 91-03; SPCS Customer Premises Equipment Data Interface, TR-TSY-000030, Bellcore, Issue 1, November 1988; Call Waiting LSSGR, Feature Specific Document (FSD) 01-02-1201, TR-TSY-000522, Issue 2, July 1987, CLASS Calling Name Delivery and Related Features Generic Requirements, TA-NWT-001188, Issue 1, Bellcore, March 1991; and CLASS Feature: Calling Number Delivery, TR-TSY-000031, Bellcore, Issue 3, January 1990; and Caller Identification With Call Waiting: Request for Information From Customer Premises Equipment Suppliers, RFI-91-03, April 1991. Each of these documents is incorporated herein by reference. Briefly, caller ID uses the time interval between the first two rings of the called-party telephone to transmit information to that telephone. The information is FSK-modulated and includes a preamble followed by data including a message type, a data count, and data such as month, day, hour, minute, phone number, name, etc. Many new home and office telephones have built-in CID receivers and LCD screens. As described below, by using the CID transmission protocol, the systems and methods described herein provide for sending information such as e-mail, text, messages, cellular telephone directories and the like to communication device 102. Thus, by using the CID type 1 and/or CID type 2 (CIDCW) protocols, the communication systems and methods described herein can send information to the communication device 102.

By way of illustration, stored telephone numbers in a cellular telephone's phonebook may be displayed on communication devices such as telephones that have built-in caller-ID LCD screens. This is advantageous because it enables users of standard landline telephones to retrieve names and telephone numbers stored within their cellular telephones and then place a cellular or landline call from the standard landline telephone using these names and telephone numbers. This feature may be implemented as follows.

Each time a cellular telephone is connected to the interface circuitry, the names and telephone numbers stored in the memory of the cellular telephone are synchronized with the names and telephone numbers stored in memory 42. Specifically, DSP 22 (122) detects the presence of a connection to a cellular telephone and sends a command to the cellular telephone to transfer the contents of its phonebook. DSP 22 (122) updates the phonebook contents in memory 42 (142) based on the contents transferred from the cellular telephone. These steps are performed each time the cellular telephone is connected to the interface circuitry.

To view names and/or telephone numbers that are stored in the cellular telephone's phonebook, the user picks up the standard landline telephone. At this point, the user can do one of four things: (1) make a landline telephone call as described above; (2) make a cellular telephone call as described above; (3) make a voice-over-IP call as described above, or (4) enter a predetermined code to view the contents (names and telephone numbers) of the cellular telephone's phonebook. By way of example, the predetermined code for view the phonebook contents may be "*7", although it will be appreciated that the invention is not limited in this respect.

Ringing SLIC 20 (12) detects the user's inputs and forwards the inputs to DSP 22 (122). If the DSP determines that the user has input the predetermined code for accessing the phonebook, the DSP retrieves the first name and telephone number from the phonebook stored in memory 42 (142) and encodes the name and telephone number using the CID protocol. DSP 22 (122) then instructs ringing SLIC 20 (120) to send an alert tone to the CID receiver within the user's communication device 102. Upon receiving an acknowledge tone from the CID receiver via ringing SLIC 20 (120), DSP 22 (122) forwards the CID packet (name and telephone number) to ringing SLIC 20 (120). Ringing SLIC 20 (120) then transmits the CID information to the CID-enabled communication device 102, which then displays the name and telephone number on display 210. At this point, the user has a number of options. First, the user can press a predetermined code to dial the telephone number that is displayed. While in the cellular phonebook mode, the user can press one predetermined code (e.g., "*") to place the call via cellular phone 108 or another predetermined code (e.g., "#") to place the call using the landline. Second, the user can press a predetermined code to end the phonebook mode. Third, the user can press a predetermined code to go to the next name in the phonebook. Fourth, the user can press a predetermined code to go to the previous name in the phonebook. Fifth, the user can press one of the numbers 2 through 9 to jump to the first name that begins with the first letter corresponding to the number. For example, pressing "6" would jump to the first name beginning with "M" in the phonebook. Pressing "6" again would result in the display of the first name beginning with "N", while pressing "6" yet again would result in the display of the first name beginning with "O".

By utilizing the CID protocol, text messages from any source can be transmitted to a CID enabled home telephone. An example of this is as follows. Because the system has the capability to retrieve data from the internet, a user may retrieve stock quotes via the internet to their CID enabled telephone. To enable the stock quote system, the user presses a predetermined code (e.g., "*78") and the corresponding key which represents the ticket symbol for the stock they are interested in. DSP 22 and DAA 36 are configured to access a web site having the desired information. For example if the user wants to get a quote for America Online (AOL). The user will press the "2" button once (which represents the letter A), and the "6" button three times (which represents 0), and finally the "5" button 3 times (which represents L). The user then presses the # button. Although the user will see the letters "AOL" on the screen, internally DSP 22 (122) will recognize the following number sequence (i.e., 2666777#). The system will retrieve the stock quote from the internet and transmit the quote to the telephone using the CID protocol.

While a user is on a call, communication device 102 may display indicia indicating the call type (e.g., whether the user is currently on a landline call or on a wireless call). In one example implementation, DSP 22 may forward text to the communication device using the CID protocol. If the user is on a landline call, the text may be "landline" or "PSTN" or some other text for informing a user that he or she is currently on a landline call. If the user is on a wireless call, the text may be "cell" or "wireless" or some other text for informing the user that he or she is currently on a wireless call. In addition, communication device 102 may display indicia indicating call status (e.g., dialing, connecting, busy, etc.). Like the call type indicia, the call status indicia may be provided to communication device 102 as text from DSP 22 using the CID protocol. Still further, user instructions may be provided on the display of communication device 102. For example, when the communication device goes off-hook, instructions like "press # to make a landline call" and/or "enter number followed by # to make wireless call" may be displayed to guide the user. When the user is on a call and there is an incoming call, an instruction like "press flash to connect to incoming call" may be displayed. It will be readily apparent that more sophisticated indicia such as images or graphics are possible. For example, communication device 102 (e.g., handset 202) may be provided with on-board memory for storing images, graphics and even audio and video for displaying call type data, call status data and/or user instructions. The appropriate data may be read out from the memory in response to instructions from DSP 22.

In another example embodiment, base unit 204 of FIG. 4 may be provided with its own display (not shown). The display may be used to provide the call type data, call status data and/or user instructions discussed above (in textual, graphic, image, and/or video form, for example). These displays may be based on data stored in memory 42. In addition, the display may be used to display any other data (including video, images, and graphics) stored in memory 42 or obtained from the landline or the wireless communication network. Audio corresponding to the video may be output via the base unit's speaker.

In still further arrangements, DSP 22 (122) may be programmed to recognize the wireless communication device that is placed in the cradle using, for example, an identifier associated with the device. Alternatively, the owner of the device may input a predetermined code using a keypad of the device to identify the device. In this case, DSP 22 (122) may maintain data for that device in an area of memory 42 (142). Thus, for each of a plurality of different devices, memory 42 (142) may contain, for example, a telephone directory (names and numbers) for that device. Thus, a user of the communication device 102 may be provided a display of telephone numbers that correspond to the device currently in the cradle. In addition, the user may input names and telephone numbers for the directory using communication device 102. Memory 42 (142) may also maintain preferences for each different wireless device connected to the cradle. For example, each wireless communication device may have a list of do not accept call numbers or restricted calling times.

The above-described example embodiments enable cellular phone-users to receive and place cellular phone calls using their standard home and/or office telephones and bypass the local telephone company. In addition, a high-gain (e.g., 6 dB) directional wireless antenna may be provided that allows users to place and make their wireless calls in areas where the wireless reception is very weak such as homes and offices. This high-gain cellular antenna permits is particularly advantageous to those wireless users who are not able to use their wireless devices at home during the times when long distance calls are promised to be free or at reduced rates (i.e., nights and weekends).

The above-described embodiments do not require users to have multiple line telephones installed in their homes and/or offices and communication devices that are connected to the interface circuitry can still be used to place and receive regular landline calls. These embodiments also provide built-in call waiting for both wireless and regular landline calls. While users are on a regular landline call, any incoming wireless call will produce a call waiting tone and the reverse is true when a user is on a wireless call. The embodiments allow users to receive and/or place all calls through both wireless and landline telephones that are connected to the interface circuitry. The wireless telephone charges while in the cradle.

The above example embodiments show a landline communication device connected via interface circuitry to a single cellular telephone. However, the invention is not limited in this respect and the landline communication device may be connected to two or more devices that provide access to different communication networks. For example, the arrangement shown in FIG. 4 may be modified to provide cradles for both a cellular telephone and a satellite telephone. In this case the interface circuitry may be configured to permit cellular calls to be made by entering one predetermined code into the landline communication device and to permit satellite calls to be made by entering another different predetermined code into the landline communication device. The FIG. 4 arrangement may also be modified to provide cradles for two or more cellular telephones and/or two or more satellite telephones. This may be useful for households or offices having two or more persons each of whom has his/her own cellular or satellite telephone. Each person may be assigned a different predetermined code so that the interface circuitry can access his/her cellular telephone to place calls.

The systems and methods described herein can even be used in the event that the interface circuitry is not connected to a line pair for the PSTN. This might be the case, for example, in areas or regions where there is no access to the PSTN. In such areas and regions, wireless communication over a cellular network, for example, may be the primary method for telecommunication. If the interface circuitry described herein is used in this situation, users may still place and receive cellular calls using a conventional landline telephone, even though the interface circuitry is not connected to a line pair for the PSTN. Because of the limited talking time on wireless telephones due to limited battery life, heating up of the device, or poor ergonomics, the systems and methods described herein allow the user to extend his/her talking time.

While the invention has been described in connection with certain embodiments, it is to be understood that the invention is not to be limited to the disclosed embodiment, but on the contrary, is intended to cover various modifications and equivalent arrangements included within the spirit and scope of the appended claims.

I claim:

1. A communication system comprising:
a landline communication device comprising circuitry adapted to place and receive calls over a landline communication network; and
interface circuitry connected to a single ring-tip line pair of a landline communication network and to a wireless communication device for a wireless communication network, wherein the interface circuitry selectively connects the landline communication device to the ring-tip line pair so that calls are placed and received by the landline communication device over the landline communication network and to the wireless communication device so that calls are placed and received by the landline communication device over the wireless communication network via the wireless communication device, wherein the interface circuitry detects if the ring-tip line pair is in use and, if so, automatically places calls from the landline communication device using the wireless communication device.

2. A communication system comprising:
a landline communication device comprising circuitry adapted to place and receive calls over a landline communication network; and interface circuitry connected to a single ring-tip line pair of a landline communication network and to a wireless communication device for a wireless communication network, wherein the interface circuitry selectively connects the landline communication device to the ring-tip line pair so that calls are placed and received by the landline communication device over the landline communication network and to the wireless communication device so that calls are placed and received by the landline communication device over the wireless communication network via the wireless communication device,
wherein the interface circuitry comprises signal-boosting circuitry for boosting a signal of the wireless communication device.

3. A communication system comprising:
a landline communication device comprising circuitry adapted to place and receive calls over a landline communication network; and
interface circuitry connected to a single ring-tip line pair of a landline communication network and to a wireless communication device for a wireless communication network, wherein the interface circuitry selectively connects the landline communication device to the ring-tip line pair so that calls are placed and received by the landline communication device over the landline communication network and to the wireless communication device so that calls are placed and received by the landline communication device over the wireless communication network via the wireless communication device,
wherein the interface circuitry comprises:
a first switch connected between the landline communication device and the ring-tip line pair;
a second switch connected between the landline communication device and the wireless communication device; and
a processing circuit for controlling the first and second switches.

4. A communication system comprising:
a landline communication device comprising circuitry adapted to place and receive calls over a landline communication network; and
interface circuitry connected to a single ring-tip line pair of a landline communication network and to a wireless communication device for a wireless communication network, wherein the interface circuitry selectively connects the landline communication device to the ring-tip line pair so that calls are placed and received by the landline communication device over the landline communication network and to the wireless communication device so that calls are placed and received by the landline communication device over the wireless communication network via the wireless communication device,
wherein the interface circuitry determines whether to place a landline or wireless call in response to a user input.

5. The communication system according to claim 4, wherein the landline communication device comprises a cordless telephone.

6. The communication system according to claim 4, wherein the interface circuitry permits other landline communication devices to use the ring-tip line pair if the landline communication device is used to place or receive a wireless call.

7. The communication system according to claim 4, wherein the wireless communication network comprises a cellular network.

8. The communication system according to claim 4, wherein the landline communication network comprises the public switched telephone network.

9. The communication system according to claim 4, wherein the landline communication device comprises a landline telephone.

10. The communication system according to claim 4, wherein the wireless communication device comprises a cellular telephone.

11. The communication system according to claim 4, wherein the wireless communication device comprises a personal digital assistant (PDA).

12. The communication system according to claim 3, wherein the processing circuit controls the first and second switches so as to conference together a landline call and a wireless call.

13. The communication system according to claim 3, wherein the processing circuit controls the first and second switches so as to place one of a landline call and a wireless call involving the landline communication device on hold and to connect the landline communication device to the other of a landline call and a wireless call.

14. The communication system according to claim 1, wherein the interface circuitry comprises a switching arrangement and a processing circuit for controlling the switching arrangement so as to selectively conference together a landline call and a wireless call.

15. The communication system according to claim 1, wherein the interface circuitry comprises a switching arrangement and a processing circuit for controlling the switching arrangement so as to selectively place one of a landline call and a wireless call involving the landline communication device on hold and to connect the landline communication device to the other of a landline call and a wireless call.

16. The communication system according to claim 1, wherein the landline communication device comprises a cordless telephone.

17. The communication system according to claim 2, wherein the interface circuitry comprises a switching arrangement and a processing circuit for controlling the switching arrangement so as to selectively conference together a landline call and a wireless call.

18. The communication system according to claim 2, wherein the interface circuitry comprises a switching arrangement and a processing circuit for controlling the switching arrangement so as to selectively place one of a landline call and a wireless call involving the landline communication device on hold and to connect the landline communication device to the other of a landline call and a wireless call.

19. The communication system according to claim 2, wherein the interface circuitry detects if the ring-tip line pair is in use and, if so, automatically places calls from the landline communication device using the wireless communication device.

20. The communication system according to claim 2, wherein the landline communication device comprises a cordless telephone.

21. The communication system according to claim 4, wherein the interface circuitry comprises a switching arrangement and a processing circuit for controlling the switching arrangement so as to selectively conference together a landline call and a wireless call.

22. The communication system according to claim 4, wherein the interface circuitry comprises a switching arrangement and a processing circuit for controlling the switching arrangement so as to selectively place one of a landline call and a wireless call involving the landline communication device on hold and to connect the landline communication device to the other of a landline call and a wireless call.

23. The communication system according to claim 4, wherein the interface circuitry detects if the ring-tip line pair is in use and, if so, automatically places calls from the landline communication device using the wireless communication device.

* * * * *